(12) United States Patent
Meki

(10) Patent No.: US 10,193,617 B2
(45) Date of Patent: Jan. 29, 2019

(54) RELAY METHOD, RELAY SYSTEM, RECORDING MEDIUM, AND METHOD

(71) Applicant: FUJITSU LIMITED, Kawasaki-shi, Kanagawa (JP)

(72) Inventor: Seiji Meki, Nonoichi (JP)

(73) Assignee: FUJITSU LIMITED, Kawasaki-Shi (JP)

(*) Notice: Subject to any disclaimer, the term of this patent is extended or adjusted under 35 U.S.C. 154(b) by 127 days.

(21) Appl. No.: 15/357,050

(22) Filed: Nov. 21, 2016

(65) Prior Publication Data

US 2017/0070284 A1  Mar. 9, 2017

Related U.S. Application Data

(62) Division of application No. 14/192,330, filed on Feb. 27, 2014, now Pat. No. 9,509,398.

(30) Foreign Application Priority Data

Mar. 18, 2013  (JP) ................................. 2013-055001

(51) Int. Cl.
*H04B 10/038* (2013.01)
*H04L 12/24* (2006.01)
(Continued)

(52) U.S. Cl.
CPC ....... *H04B 10/038* (2013.01); *H04B 10/0791* (2013.01); *H04B 10/2755* (2013.01);
(Continued)

(58) Field of Classification Search
CPC ............. H04B 10/038; H04B 10/0791; H04B 10/2755; H04B 10/29; H04L 12/437; H04L 12/4641
See application file for complete search history.

(56) References Cited

U.S. PATENT DOCUMENTS

2003/0108029 A1  6/2003  Behzadi
2006/0209895 A1  9/2006  Hirota
(Continued)

FOREIGN PATENT DOCUMENTS

JP  2004-336501  11/2004
JP  2006-261806   9/2006
(Continued)

OTHER PUBLICATIONS

U.S. Office Action dated Jan. 20, 2016 in corresponding U.S. Appl. No. 14/192,330.
(Continued)

*Primary Examiner* — Kiet Tang
(74) *Attorney, Agent, or Firm* — Staas & Halsey LLP

(57) ABSTRACT

A relay method includes transmitting, by a first apparatus in a ring network, a first control frame in which information of the first apparatus is stored, through a first port different from a second port where a communication failure is detected; receiving, by a second apparatus in the ring network, the first control frame through a third port, when the communication failure does not occur at a side of a fourth port different from the third port: storing information of the second apparatus in the first control frame; and transmitting the first control frame through the fourth port; and when the communication failure occurs at the side of the fourth port, determining whether a data frame flowing into the ring network is affected by the communication failure for every VLAN (virtual local area network) based on the first control frame; and switching a communication path set in an affected VLAN.

14 Claims, 26 Drawing Sheets

(51) Int. Cl.
  *H04L 12/751* (2013.01)
  *H04B 10/079* (2013.01)
  *H04B 10/275* (2013.01)
  *H04L 12/437* (2006.01)
  *H04L 12/46* (2006.01)
  *H04B 10/29* (2013.01)

(52) U.S. Cl.
  CPC .......... *H04B 10/29* (2013.01); *H04L 12/437* (2013.01); *H04L 12/4641* (2013.01)

(56) References Cited

U.S. PATENT DOCUMENTS

| | | |
|---|---|---|
| 2008/0259784 A1 | 10/2008 | Allan |
| 2009/0168671 A1 | 7/2009 | Holness |
| 2009/0296569 A1 | 12/2009 | Ramalho Ribeiro Dos Santos et al. |
| 2010/0226260 A1 | 9/2010 | Zinjuvadia |
| 2011/0063971 A1 | 3/2011 | Tochio |
| 2011/0176550 A1 | 7/2011 | Wang |
| 2012/0044803 A1 | 2/2012 | Zhang |

FOREIGN PATENT DOCUMENTS

| | | |
|---|---|---|
| JP | 2008-104144 | 5/2008 |
| JP | 2011-66564 | 3/2011 |

OTHER PUBLICATIONS

U.S. Supplemental Notice of Allowability dated Sep. 1, 2016 in corresponding U.S. Appl. No. 14/192,330.
U.S. Notice of Allowance dated Jul. 28, 2016 in corresponding U.S. Appl. No. 14/192,330.
"IEEE Standard for Local and metropolitan area networks—Virtual Bridged Local Area Networks" IEEE Computer Society, May 19, 2006.
Japanese Office Action dated Jul. 5, 2016 in corresponding Japanese Patent Application No. 2013-055001.
U.S. Appl. No. 14/192,330, filed Feb. 27, 2014, Seiji Meki, Fujitsu Limited.

FIG. 3A

NODE 1,4,5

| VLAN | PORT | TRANSMISSION AND RECEPTION SETTING | CHANGE STATUS |
|---|---|---|---|
| | | ⋮ | |
| 100 | 1 | ON | UNCHANGED |
| | 2 | ON | UNCHANGED |
| | | ⋮ | |

NODE 2,6

| VLAN | PORT | TRANSMISSION AND RECEPTION SETTING | CHANGE STATUS |
|---|---|---|---|
| | | ⋮ | |
| 100 | 1 | ON | UNCHANGED |
| | 2 | OFF | UNCHANGED |
| | | ⋮ | |

NODE 3,8

| VLAN | PORT | TRANSMISSION AND RECEPTION SETTING | CHANGE STATUS |
|---|---|---|---|
| | | ⋮ | |
| 100 | 1 | OFF | UNCHANGED |
| | 2 | ON | UNCHANGED |
| | | ⋮ | |

NODE 7

| VLAN | PORT | TRANSMISSION AND RECEPTION SETTING | CHANGE STATUS |
|---|---|---|---|
| | | ⋮ | |
| 100 | 1 | OFF | UNCHANGED |
| | 2 | OFF | UNCHANGED |
| | | ⋮ | |

FIG. 3B

NODE 1,4,5,7

| VLAN | PORT | TRANSMISSION AND RECEPTION SETTING | CHANGE STATUS |
|---|---|---|---|
| | | ⋮ | |
| 100 | 3 | OFF | - |
| | 4 | OFF | - |
| | 5 | OFF | - |
| | | ⋮ | |

NODE 2

| VLAN | PORT | TRANSMISSION AND RECEPTION SETTING | CHANGE STATUS |
|---|---|---|---|
| | | ⋮ | |
| 100 | 3 | ON | LOW |
| | 4 | OFF | - |
| | 5 | OFF | - |
| | | ⋮ | |

NODE 3,6

| VLAN | PORT | TRANSMISSION AND RECEPTION SETTING | CHANGE STATUS |
|---|---|---|---|
| | | ⋮ | |
| 100 | 3 | OFF | - |
| | 4 | OFF | - |
| | 5 | ON | HIGH |
| | | ⋮ | |

NODE 8

| VLAN | PORT | TRANSMISSION AND RECEPTION SETTING | CHANGE STATUS |
|---|---|---|---|
| | | ⋮ | |
| 100 | 3 | OFF | - |
| | 4 | ON | LOW |
| | 5 | OFF | - |
| | | ⋮ | |

NUMBER INSIDE NODE: NODE ID
NUMBERS OUTSIDE NODE: PORT ID

FIG. 8

| FIELD | LENGTH (byte) | CONTENT |
|---|---|---|
| DA | 6 | DESTINATION ADDRESS |
| SA | 6 | SOURCE ADDRESS |
| VLAN TAG | 4 | INFORMATION ADDED TO BEGINNING OF DATA ABOUT ALL FRAMES<br><br>LAST FRAME FLAG: 4 BYTES<br>　[0: NOT LAST, 1: LAST] |
| TYPE | 2 | SOURCE ADDRESS |
| DATA | 42-1500 | INFORMATION ADDED TO BEGINNING OF DATA ABOUT ALL FRAMES<br>　LAST FRAME FLAG: 4 BYTES<br>　[0: NOT LAST, 1: LAST]<br><br>SEQUENTIALLY STORE IN DATA FIELDS OF FRAME TO BE DIVIDED<br>　PRESENCE OF INFORMATION : 1 BYTE<br>　(DATA) 8 (NUMBER OF NODES)<br>　[0: NO, 1: YES]<br>　CONNECTION INFORMATION ABOUT EACH COMMUNICATION PATH<br>　: 1 BYTE (DATA) 8 (NUMBER OF NODES) 4096 (VLAN)<br>　[UPPER 4 BITS REPRESENT PRIORITY, 0000: LOW, 0001: HIGH<br>　LOWER 4 BITS REPRESENTS PORT NUMBER, 0001:1, 0010:2] |
| FCS | 4 | ERROR CHECK OF FRAME |

FIG. 10A

| VLAN | NODE 4 | NODE 3 | NODE 2 | NODE 1 | NODE 8 | NODE 7 | NODE 6 | NODE 5 |
|---|---|---|---|---|---|---|---|---|
| PRESENCE OF INFORMATION | YES (1) | NO (0) | NO (0) | NO (0) | NO (0) | NO (0) | NO (0) | NO (0) |
| ... | ... | ... | ... | ... | ... | ... | ... | ... |
| 100 | 0 | 0 | 0 | 0 | 0 | 0 | 0 | 0 |
| 101 | 0 | 0 | 0 | 0 | 0 | 0 | 0 | 0 |
| 102 | 0 | 0 | 0 | 0 | 0 | 0 | 0 | 0 |
| 103 | 0 | 0 | 0 | 0 | 0 | 0 | 0 | 0 |
| ... | ... | ... | ... | ... | ... | ... | ... | ... |

FIG. 10B

| VLAN | NODE 4 | NODE 3 | NODE 2 | NODE 1 | NODE 8 | NODE 7 | NODE 6 | NODE 5 |
|---|---|---|---|---|---|---|---|---|
| PRESENCE OF INFORMATION | YES (1) | YES (1) | YES (1) | YES (1) | YES (1) | YES (1) | YES (1) | NO (0) |
| ... | ... | ... | ... | ... | ... | ... | ... | ... |
| 100 | 0 | HIGH:2 | LOW:1 | 0 | LOW:2 | 0 | HIGH:1 | 0 |
| 101 | 0 | HIGH:1 | 0 | 0 | HIGH:2 | 0 | 0 | 0 |
| 102 | 0 | LOW:2 | LOW:1 | 0 | LOW:2 | 0 | LOW:1 | 0 |
| 103 | 0 | 0 | 0 | 0 | 0 | 0 | 0 | 0 |
| ... | ... | ... | ... | ... | ... | ... | ... | ... |

FIG. 10C

| VLAN | NODE 4 | NODE 3 | NODE 2 | NODE 1 | NODE 8 | NODE 7 | NODE 6 | NODE 5 |
|---|---|---|---|---|---|---|---|---|
| PRESENCE OF INFORMATION | YES (1) | YES (1) | YES (1) | YES (1) | YES (1) | YES (1) | YES (1) | YES (1) |
| ... | ... | ... | ... | ... | ... | ... | ... | ... |
| 100 | 0 | HIGH:2 | LOW:1 | 0 | LOW:2 | 0 | HIGH:1 | 0 |
| 101 | 0 | HIGH:1 | 0 | 0 | HIGH:2 | 0 | 0 | 0 |
| 102 | 0 | LOW:2 | LOW:1 | 0 | LOW:2 | 0 | LOW:1 | 0 |
| 103 | 0 | 0 | 0 | 0 | 0 | 0 | 0 | 0 |
| ... | ... | ... | ... | ... | ... | ... | ... | ... |

FIG. 11A

| VLAN | HIGH PRIORITY | LOW PRIORITY |
|---|---|---|
| ⋮ | | |
| 100 | YES | NO |
| 101 | NO | NO |
| 102 | NO | YES |
| 103 | NO | NO |
| ⋮ | | |

FIG. 11B

| VLAN | SWITCHING NECESSITY |
|---|---|
| ⋮ | |
| 100 | SWITCHING |
| 101 | NO-SWITCHING |
| 102 | SWITCHING |
| 103 | NO-SWITCHING |
| ⋮ | |

FIG. 13

| FIELD | LENGTH (byte) | CONTENT |
|---|---|---|
| DA | 6 | DESTINATION ADDRESS |
| SA | 6 | SOURCE ADDRESS |
| VLAN TAG | 4 | TYPE VALUE (2 BYTES) AND TAG CONTROL INFORMATION (2 BYTES)<br><br>VLAN ID (10 BITS) IS INCLUDED IN TAG CONTROL INFORMATION<br>    TYPE VALUES: 0xfff0, 0xfff1, 0xfff2, 0Xfff3 |
| TYPE | 2 | TYPE VALUE |
| DATA | 512 | SWITCHING NECESSITY INFORMATION OR RETURN NECESSITY INFORMATION ABOUT EACH VLAN<br>  : 1 BIT (DATA) 4096 (VLAN)<br>  [DATA ABOUT ONE VLAN IN 1 BIT:<br>  0: NOT    NECESSARY, 1: NECESSARY]<br><br>ARRANGE BITS IN ORDER OF VLAN ID = 0, 1 ⋯ 4095 |
| FCS | 4 | ERROR CHECK OF FRAME |

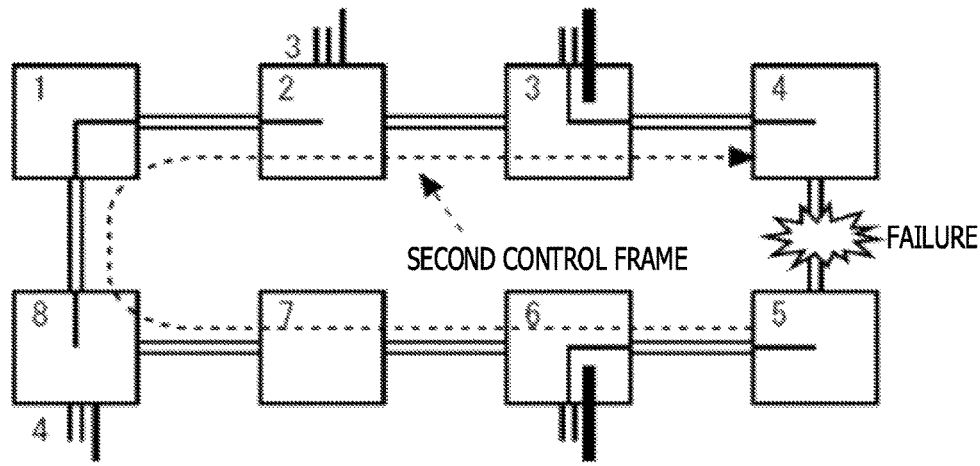

FIG. 14C

NODE 1,4,5,7

| VLAN | PORT | TRANSMISSION AND RECEPTION SETTING | CHANGE STATUS |
|---|---|---|---|
| ⋮ | | | |
| 100 | 3 | OFF | - |
| | 4 | OFF | - |
| | 5 | OFF | - |
| ⋮ | | | |

NODE 2

| VLAN | PORT | TRANSMISSION AND RECEPTION SETTING | CHANGE STATUS |
|---|---|---|---|
| ⋮ | | | |
| 100 | 3 | OFF | LOW |
| | 4 | OFF | - |
| | 5 | OFF | - |
| ⋮ | | | |

NODE 3,6

| VLAN | PORT | TRANSMISSION AND RECEPTION SETTING | CHANGE STATUS |
|---|---|---|---|
| ⋮ | | | |
| 100 | 3 | OFF | - |
| | 4 | OFF | - |
| | 5 | ON | HIGH |
| ⋮ | | | |

NODE 8

| VLAN | PORT | TRANSMISSION AND RECEPTION SETTING | CHANGE STATUS |
|---|---|---|---|
| ⋮ | | | |
| 100 | 3 | OFF | - |
| | 4 | OFF | LOW |
| | 5 | OFF | - |
| ⋮ | | | |

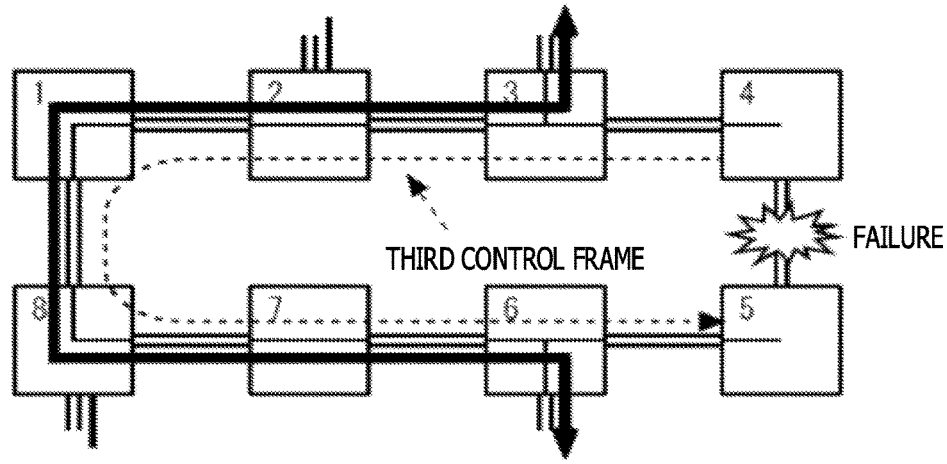

FIG. 16C

NODE 1,4,5,7

| VLAN | PORT | TRANSMISSION AND RECEPTION SETTING | CHANGE STATUS |
|---|---|---|---|
| | ⋮ | | |
| 100 | 3 | OFF | - |
| | 4 | OFF | - |
| | 5 | OFF | - |
| | ⋮ | | |

NODE 2

| VLAN | PORT | TRANSMISSION AND RECEPTION SETTING | CHANGE STATUS |
|---|---|---|---|
| | ⋮ | | |
| 100 | 3 | OFF | LOW |
| | 4 | OFF | - |
| | 5 | OFF | - |
| | ⋮ | | |

NODE 3,6

| VLAN | PORT | TRANSMISSION AND RECEPTION SETTING | CHANGE STATUS |
|---|---|---|---|
| | ⋮ | | |
| 100 | 3 | OFF | - |
| | 4 | OFF | - |
| | 5 | ON | HIGH |
| | ⋮ | | |

NODE 8

| VLAN | PORT | TRANSMISSION AND RECEPTION SETTING | CHANGE STATUS |
|---|---|---|---|
| | ⋮ | | |
| 100 | 3 | OFF | - |
| | 4 | OFF | LOW |
| | 5 | OFF | - |
| | ⋮ | | |

FIG. 19A

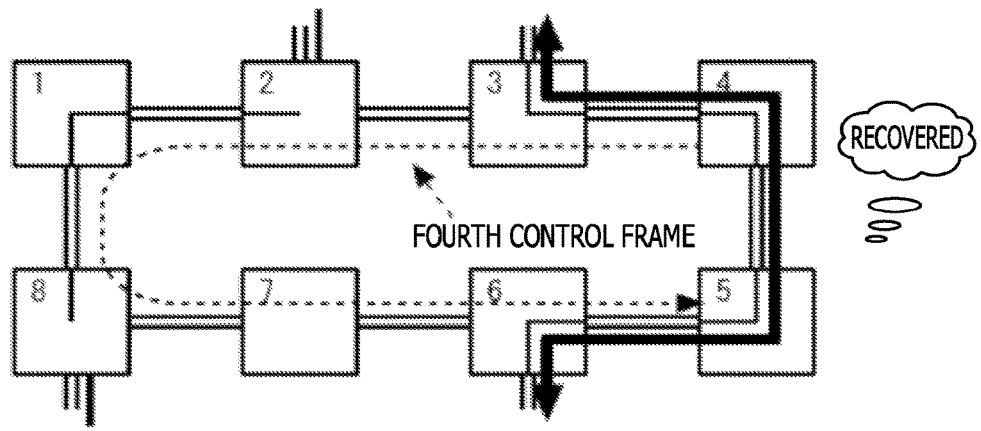

FOURTH CONTROL FRAME — RECOVERED

FIG. 19B

NODE 1

| VLAN | PORT | TRANSMISSION AND RECEPTION SETTING | CHANGE STATUS |
|---|---|---|---|
| 100 | 1 | ON | UNCHANGED |
|  | 2 | ON | UNCHANGED |

NODE 2,6

| VLAN | PORT | TRANSMISSION AND RECEPTION SETTING | CHANGE STATUS |
|---|---|---|---|
| 100 | 1 | ON | UNCHANGED |
|  | 2 | OFF | UNCHANGED |

NODE 3,8

| VLAN | PORT | TRANSMISSION AND RECEPTION SETTING | CHANGE STATUS |
|---|---|---|---|
| 100 | 1 | OFF | UNCHANGED |
|  | 2 | ON | UNCHANGED |

NODE 4

| VLAN | PORT | TRANSMISSION AND RECEPTION SETTING | CHANGE STATUS |
|---|---|---|---|
| 100 | 1 | ON | UNCHANGED |
|  | 2 | ON | UNCHANGED |

NODE 5

| VLAN | PORT | TRANSMISSION AND RECEPTION SETTING | CHANGE STATUS |
|---|---|---|---|
| 100 | 1 | ON | UNCHANGED |
|  | 2 | ON | UNCHANGED |

NODE 7

| VLAN | PORT | TRANSMISSION AND RECEPTION SETTING | CHANGE STATUS |
|---|---|---|---|
| 100 | 1 | OFF | UNCHANGED |
|  | 2 | OFF | UNCHANGED |

FIG. 19C

NODE 1,4,5,7

| VLAN | PORT | TRANSMISSION AND RECEPTION SETTING | CHANGE STATUS |
|---|---|---|---|
| | ⋮ | | |
| 100 | 3 | OFF | - |
| | 4 | OFF | - |
| | 5 | OFF | - |
| | ⋮ | | |

NODE 2

| VLAN | PORT | TRANSMISSION AND RECEPTION SETTING | CHANGE STATUS |
|---|---|---|---|
| | ⋮ | | |
| 100 | 3 | OFF | LOW |
| | 4 | OFF | - |
| | 5 | OFF | - |
| | ⋮ | | |

NODE 3,6

| VLAN | PORT | TRANSMISSION AND RECEPTION SETTING | CHANGE STATUS |
|---|---|---|---|
| | ⋮ | | |
| 100 | 3 | OFF | - |
| | 4 | OFF | - |
| | 5 | ON | HIGH |
| | ⋮ | | |

NODE 8

| VLAN | PORT | TRANSMISSION AND RECEPTION SETTING | CHANGE STATUS |
|---|---|---|---|
| | ⋮ | | |
| 100 | 3 | OFF | - |
| | 4 | OFF | LOW |
| | 5 | OFF | - |
| | ⋮ | | |

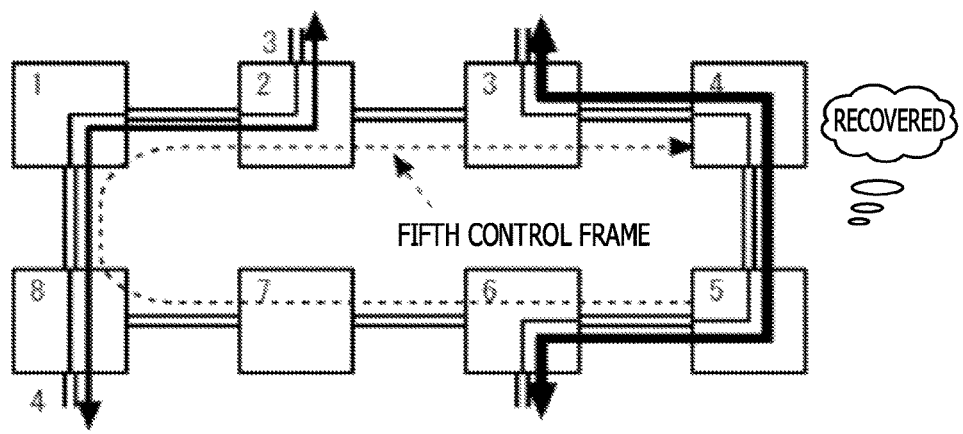

FIG. 21C

NODE 1,4,5,7

| VLAN | PORT | TRANSMISSION AND RECEPTION SETTING | CHANGE STATUS |
|---|---|---|---|
| | ⋮ | | |
| 100 | 3 | OFF | - |
| | 4 | OFF | - |
| | 5 | OFF | - |
| | ⋮ | | |

NODE 2

| VLAN | PORT | TRANSMISSION AND RECEPTION SETTING | CHANGE STATUS |
|---|---|---|---|
| | ⋮ | | |
| 100 | 3 | ON | LOW |
| | 4 | OFF | - |
| | 5 | OFF | - |
| | ⋮ | | |

NODE 3,6

| VLAN | PORT | TRANSMISSION AND RECEPTION SETTING | CHANGE STATUS |
|---|---|---|---|
| | ⋮ | | |
| 100 | 3 | OFF | - |
| | 4 | OFF | - |
| | 5 | ON | HIGH |
| | ⋮ | | |

NODE 8

| VLAN | PORT | TRANSMISSION AND RECEPTION SETTING | CHANGE STATUS |
|---|---|---|---|
| | ⋮ | | |
| 100 | 3 | OFF | - |
| | 4 | ON | LOW |
| | 5 | OFF | - |
| | ⋮ | | |

RELAY METHOD, RELAY SYSTEM, RECORDING MEDIUM, AND METHOD

CROSS REFERENCE TO RELATED APPLICATIONS

This application is a continuation of U.S. application Ser. No. 14/192,330, filed Feb. 27, 2014, which is based upon and claims the benefit of priority from the prior Japanese Patent Application No. 2013-055001, filed on Mar. 18, 2013, the entire contents of all of which are incorporated herein by reference.

BACKGROUND OF THE INVENTION

1. Field of the Invention

The embodiments discussed herein are related to a relay method, a relay system, a recording medium, and a method.

2. Description of the Related Art

Ring topologies are known as network topologies for communication networks. A typical ring topology is a network configuration in which relay apparatuses including bridges and Layer 2 (L2) switches are connected in a circular pattern. Since an alternative path is ensured in the ring topology even if a communication failure occurs at part of the ring, the reliability of the communication network is improved. In the communication network adopting the ring topology (hereinafter referred to as a ring network), a block point at which a frame that circles around is discarded is known in order to avoid the circling of a frame the destination of which is unknown.

Use of a virtual local area network (VLAN) is also known in the ring network described above. The VLAN is a technology to virtually realize multiple communication networks even in one physical communication network by including an identifier for identifying each VLAN in a frame. The VLAN allows the relay apparatuses composing the ring network to be effectively used.

In the ring network using the VLANs, a technology to set the block point for each VLAN and select the VLAN having a communication path of a minimum number of hops as an optimal communication path is also known (for example, refer to Japanese Laid-open Patent Publication No. 2006-261806).

When, for example, a frame the destination of which is unknown enters the ring network using the VLANs, the frame basically circles around all the relay apparatuses until the frame is discarded at the block point set for each VLAN. However, only one communication path is allocated to the VLANs having the same identifier on the ring and only one user is capable of using the communication path. The maximum number of the identifiers of the VLANs is defined by The Institute of Electrical and Electronics Engineers, Inc. (IEEE) 802. 1Q. Accordingly, the increase in the number of identifiers may cause the ring network using the VLANs not be realized.

SUMMARY OF THE INVENTION

According to an aspect of the invention, a relay method includes transmitting, by a first apparatus in a ring network, a first control frame in which information of the first apparatus is stored, from a first port different from a second port where a communication failure is detected; receiving, by a second apparatus in the ring network, the first control frame through a third port; when the communication failure does not occur at a side of a fourth port of the second apparatus, the fourth port being different from the third port, storing information of the second apparatus in the first control frame, and transmitting the first control frame from the fourth port; and when the communication failure occurs at the side of the fourth port, determining whether a data frame flowing into the ring network is affected by the communication failure for every VLAN (virtual local area network) based on the first control frame, and switching a communication path set in the VLAN determined to be affected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

These and/or other aspects and advantages will become apparent and more readily appreciated from the following description of the embodiments, taken in conjunction with the accompanying drawings of which:

FIG. 3A illustrates an exemplary ring port table;

FIG. 3B illustrates an exemplary access port table;

FIG. 8 illustrates an exemplary format of a first control frame;

FIG. 10A illustrates an example of a Data field of the first control frame;

FIG. 10B illustrates another example of the Data field of the first control frame;

FIG. 10C illustrates an exemplary effect determination table;

FIG. 11A illustrates an exemplary effect presence table;

FIG. 11B illustrates an exemplary switching necessity table;

FIG. 13 illustrates an exemplary format of the second to fifth control frames;

FIG. 14A illustrates an example of the communication path that is set;

FIG. 14B illustrates an example of the ring port table;

FIG. 14C illustrates an example of the access port table;

FIG. 16A illustrates an example of the communication path that is set;

FIG. 16B illustrates an example of the ring port table;

FIG. 16C illustrates an example of the access port table;

FIG. 19A illustrates an example of the communication path that is set;

FIG. 19B illustrates an example of the ring port table;

FIG. 19C illustrates an example of the access port table;

FIG. 21A illustrates an example of the communication path that is set;

FIG. 21B illustrates an example of the ring port table; and

FIG. 21C illustrates an example of the access port table.

DESCRIPTION OF THE PREFERRED EMBODIMENTS

Embodiments of the present disclosure will herein be described with reference to the attached drawings.

Figure 1:
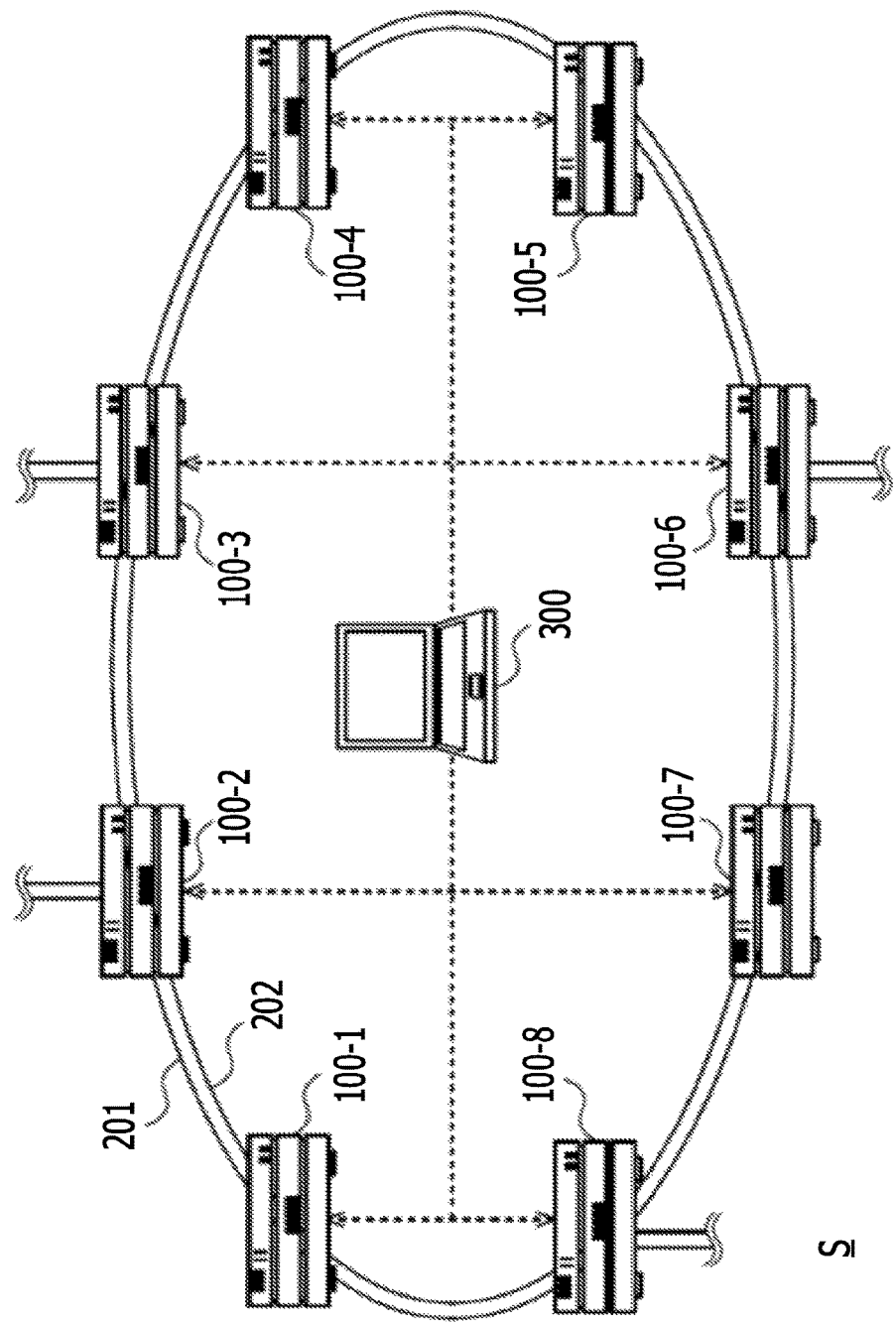
FIG. 1 illustrates an exemplary configuration of a relay system.

FIG. 1 illustrates an exemplary configuration of a relay system S.

The relay system S includes nodes 100-1 to 100-8, optical fiber cables 201 and 202, and an operations support system (OSS) 300. The relay system S has a configuration in which the eight nodes 100-1 to 100-8 are coupled to each other in a ring pattern, as illustrated in FIG. 1. The relay system S is capable of being realized by at least three nodes, among the nodes 100-1 to 100-8, which are coupled to each other in the ring pattern.

The nodes 100-1 to 100-8 each relay a frame. For example, the node 100-1 relays a frame transmitted from the adjacent node 100-2 to the adjacent node 100-8. The node 100-1 is coupled to the adjacent node 100-2 via the two optical fiber cables 201 and 202. The same applies to the remaining nodes 100-2 to 100-8. One of the optical fiber cables 201 and 202 is used for frames flowing clockwise. The other of the optical fiber cables 201 and 202 is used for frames flowing counterclockwise. The nodes 100-1 to 100-8 are, for example, bridges or L2 switches.

At least one of the nodes 100-1 to 100-8 is coupled to an apparatus outside the system, which is provided outside the relay system S, via an optical fiber cable. The apparatus outside the system is, for example, a personal computer (PC), a server, or a router. A frame that is transmitted from the apparatus outside the system to another apparatus outside the system (such a frame is hereinafter referred to as a data frame) enters the relay system S, is relayed by, for example, the nodes 100-3 to 100-6, and is transmitted to the other apparatus outside the system.

The OSS 300 manages the nodes 100-1 to 100-8 to support the operation of the relay system S. Specifically, the OSS 300 is operated by a manager who manages the relay system S. The OSS 300 issues various instructions to the nodes 100-1 to 100-8 on the basis of operations. Various operations of the nodes 100-1 to 100-8 are controlled on the basis of the content of the instructions.

The nodes 100-1 to 100-8 described above will now be described in detail with reference to FIG. 2. Since the nodes 100-1 to 100-8 has the same configuration, the node 100-1 is exemplified as a node 100.

Figure 2:
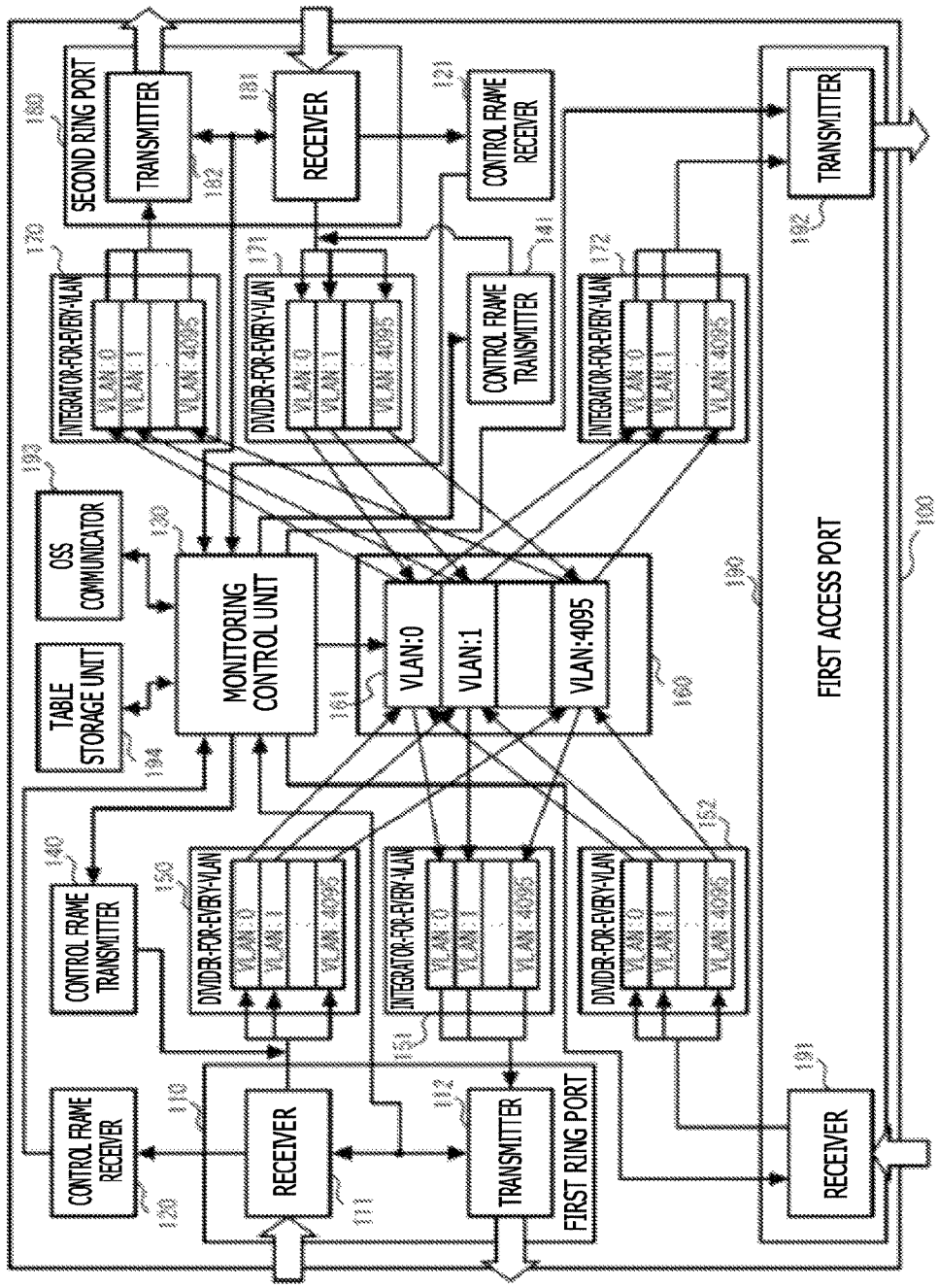
FIG. 2 is a block diagram illustrating an exemplary configuration of a node.

FIG. 2 is a block diagram illustrating an exemplary configuration of the node 100. Referring to FIG. 2, the node 100 includes a first ring port 110, control frame receivers 120 and 121, a monitoring control unit 130, control frame transmitters 140 and 141, a divider-for-every-VLAN 150, an integrator-for-every-VLAN 151, a divider-for-every-VLAN 152, a relay unit 160, an integrator-for-every-VLAN 170, a divider-for-every-VLAN 171, an integrator-for-every-VLAN 172, a second ring port 180, and a first access port 190. Second and third access ports are omitted herein.

The first ring port 110 includes a receiver 111 and a transmitter 112. The second ring port 180 includes a receiver 181 and a transmitter 182. The first access port 190 includes a receiver 191 and a transmitter 192. The same applies to the second access port and the third access port.

The receivers 111 and 181 each receive a frame transmitted from the adjacent node (for example, the node 100-2 or the node 100-8). The receiver 191 receives a frame transmitted from an apparatus outside the system. Upon reception of the frame, the receivers 111 and 181 each determine whether the frame is a control frame used to control the node 100. The determination is based on a type value included in a VLAN tag field of the frame although this will be described in detail below. If the frame is the control frame, the receivers 111 and 181 transmit the control frames to the control frame receivers 120 and 121, respectively. If the frame is not the control frame, the receivers 111 and 181 transmit the frames to the divider-for-every-VLAN 150 and the divider-for-every-VLAN 171, respectively. The receiver 191 transmits the frame to the divider-for-every-VLAN 152. The case in which the frame is not the control frame applies to, for example, a case in which the frame is the data frame. The receivers 111 and 181 each manage the communication state with the adjacent node 100 to transmit the result of the management to the monitoring control unit 130.

The control frame receivers 120 and 121 receive the control frames transmitted from the receivers 111 and 181, respectively. The control frame receivers 120 and 121 transmit the received control frames to the monitoring control unit 130.

The control frame transmitters 140 and 141 generate various control frames under the control of the monitoring control unit 130. The control frame transmitters 140 and 141 transmit the generated control frames to the divider-for-every-VLAN 150 and the divider-for-every-VLAN 171, respectively.

The divider-for-every-VLAN 150, the divider-for-every-VLAN 152, and the divider-for-every-VLAN 171 receive the frames transmitted from the receivers 111, 191, and 181, respectively, or the divider-for-every-VLAN 150 and the divider-for-every-VLAN 171 receive the frames transmitted from the control frame transmitters 140 and 141, respectively. The divider-for-every-VLAN 150 confirms a VLAN identifier (ID) of the received frame. The VLAN ID is an identifier for identifying each VLAN. The VLAN ID is included in the VLAN tag field of the frame although this will be described in detail below. Upon confirmation of the VLAN ID, the divider-for-every-VLAN 150 transmits the received frame to the relay unit 160. Specifically, the divider-for-every-VLAN 150 transmits the received frame to the corresponding switch-for-every-VLAN, among multiple switches-for-every-VLAN 161 included in the relay unit 160. The frame is logically allocated for every VLAN by the divider-for-every-VLAN 150 in the above manner and different relay processes are performed for different VLANs. Accordingly, one physical communication network is divided into multiple logical communication networks.

The relay unit 160 receives the frames from the divider-for-every-VLAN 150, the divider-for-every-VLAN 152, and the divider-for-every-VLAN 171. The relay unit 160 includes the multiple switches-for-every-VLAN 161. The switches-for-every-VLAN 161 are controlled by the monitoring control unit 130. Specifically, turning on and off of each of the multiple switches-for-every-VLAN 161 is switched for every VLAN by the monitoring control unit 130. When the switch-for-every-VLAN 161 is turned on, the relay unit 160 transmits the received frame to any of the integrator-for-every-VLAN 151, the integrator-for-every-VLAN 170, and the integrator-for-every-VLAN 172. When the switch-for-every-VLAN 161 is turned off, the relay unit 160 discards the received frame. As described above, the relay unit 160 relays or does not relay the received frame to any of the integrator-for-every-VLAN 151, the integrator-for-every-VLAN 170, and the integrator-for-every-VLAN 172. In the present embodiment, the switch-for-every-VLAN 161 is basically turned on.

The integrator-for-every-VLAN 151, the integrator-for-every-VLAN 170, and the integrator-for-every-VLAN 172 each receive the frame transmitted from the relay unit 160 for every VLAN. The integrator-for-every-VLAN 151, the integrator-for-every-VLAN 170, and the integrator-for-every-VLAN 172 each transmit the received frame to the transmitters 112, 182, and 192, respectively, for every VLAN without discriminating the VLANs. As described above, the relay process is performed for every VLAN and the multiple logical communication networks are integrated into one physical communication network by the integrator-for-every-VLAN 170.

The transmitters 112, 182, and 192 receive the frames from the integrator-for-every-VLAN 151, the integrator-for-every-VLAN 170, and the integrator-for-every-VLAN 172, respectively. Upon reception of the frames, the transmitters 112 and 182 each transmit the frame to the adjacent node (for example, the node 100-2 or the node 100-8). Upon reception of the frame, the transmitter 192 transmits the frame to an apparatus outside the system. The transmitters 112 and 182 manage the communication state with the adjacent node 100 to transmit the result of the management to the monitoring control unit 130.

As described above, the node 100 relays or does not relay the frames flowing in one direction to the adjacent node for every VLAN. The same applies to the frames flowing in the opposite direction. For example, it is determined whether the frame received from one adjacent node by the receiver 111 is relayed or not by the relay unit 160 for every VLAN and the frame is transmitted to the other adjacent node from the transmitter 182 or is transmitted to the apparatus outside the system from the transmitter 192. It is determined whether the frame received from one adjacent node by the receiver 181 is relayed or not by the relay unit 160 for every VLAN and the frame is transmitted to the other adjacent node from the transmitter 112 or is transmitted to the apparatus outside the system from the transmitter 192.

An OSS communicator 193 communicates with the OSS 300. The OSS communicator 193 receives the content of an instruction issued by the OSS 300 to transmit the content of the instruction to the monitoring control unit 130. The monitoring control unit 130 switches between the relay and the no-relay by the relay unit 160 on the basis of the content of the instruction, which is received. In other words, the relay unit 160 is capable of manually setting the switches. As a result, it is possible to set the communication path with high line efficiency. The OSS communicator 193 transmits the status of the turning on and off in the relay unit 160 to the OSS 300.

A table storage unit 194 stores various tables. For example, the table storage unit 194 stores a ring port table, an access port table, an effect determination table, an effect presence table, and a switching necessity table. The table storage unit 194 is referred to by the monitoring control unit 130 to update the content of any of the tables if desired.

The ring port table and the access point table described above will now be described in detail with reference to FIG. 3A to FIG. 3C.

Figure 3C:
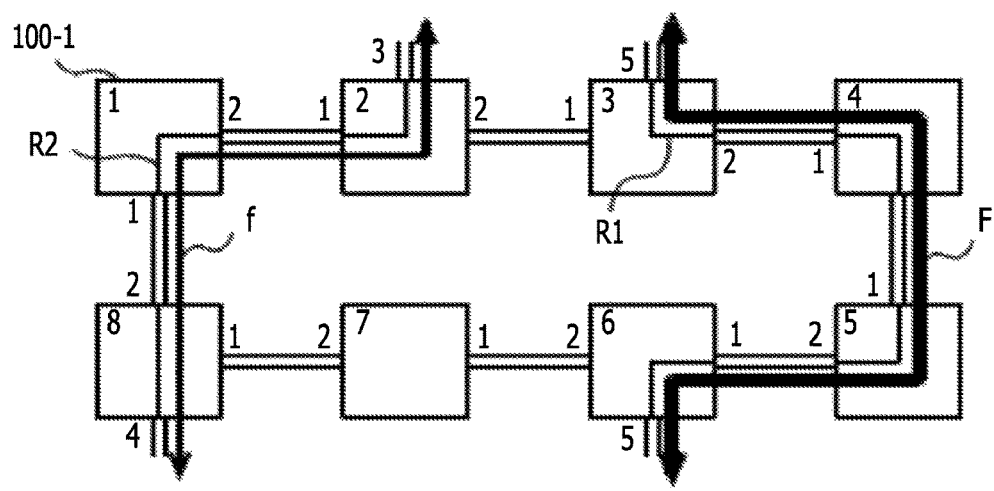
FIG. 3C illustrates an exemplary communication path that is set.

FIG. 3A illustrates an example of the ring port table. FIG. 3B illustrates an example of the access port table. FIG. 3C illustrates an example of the communication path that is set. Although both the ring port table and the access port table have VLAN IDs "0" to "4095", a VLAN ID "100" is exemplified here. The same applies to the ring port table and the access port table described below. The ring port table and the access port table are stored in the respective nodes 100-1 to 100-8.

The ring port table includes columns of VLAN, Port, Transmission and reception setting, and Change status, as illustrated in FIG. 3A. The VLAN indicates a VLAN ID. The Port indicates a port number allocated to each of the first ring port 110 and the second ring port 180. For example, a port number "1" is allocated to the first ring port 110 as a connection end and a port number "2" is allocated to the second ring port 180 as a connection end. The Transmission and reception setting indicates whether the first ring port 110 and the second ring port 180 are permitted to perform the transmission and reception. For example, when the first ring port 110 is permitted to perform the transmission and reception, the Transmission and reception setting is set to "ON". As a result, the receiver 111 is capable of reception and the transmitter 112 is capable of transmission. In contrast, when the first ring port 110 is not permitted to perform the transmission and reception, the Transmission and reception setting is set to "OFF". The same applies to the second ring port 180. The Transmission and reception setting is updated by the monitoring control unit 130. The Change status indicates whether the communication path is changed. For example, when the communication path is changed after the communication path is manually set via the OSS 300, the Change status is updated to "CHANGED". When the communication path is returned to the communication path manually set via the OSS 300 after the communication path is changed by the monitoring control unit 130, the Change status is updated to "UNCHANGED".

The access port table includes columns of VLAN, Port, Transmission and reception setting, and Priority, as illustrated in FIG. 3B. The VLAN indicates a VLAN ID. The Port indicates a port number allocated to each of the first to third access ports 190. For example, a port number "3" is allocated to the first access port 190, a port number "4" is allocated to the second access port, and a port number "5" is allocated to the third access port. The Transmission and reception setting indicates whether the first to third access ports 190 are permitted to perform the transmission and reception. For example, when the first access port 190 is permitted to perform the transmission and reception, the Transmission and reception setting is set to "ON". As a result, the receiver 191 is capable of reception and the transmitter 192 is capable of transmission. In contrast, when the first access port 190 is not permitted to perform the transmission and reception, the Transmission and reception setting is set to "OFF". The same applies to the second and third access ports. The Transmission and reception setting is updated by the monitoring control unit 130. The Priority indicates the priority of the communication path to be alleviated if a communication failure occurs. The Priority "HIGH" indicates a communication path that is alleviated if a communication failure occurs. The Priority "LOW" indicates a communication path that is not alleviated if a communication failure occurs. The Priority "-" indicates that no communication path is set. The Priority "HIGH" is capable of being set for one communication path in the same VLAN (for example, a VLAN "100"). The Priority "LOW" is capable of being set for multiple communication paths in the same VLAN (for example, the VLAN "100").

In the relay system S, communication paths R1 and R2 are uniquely determined with the ring port table and the access port table described above, as illustrated in FIG. 3C. The communication paths R1 and R2 are determined via the OSS 300 on the basis of, for example, the line efficiency. Referring to FIG. 3C, a node ID "1" is indicated inside the node 100-1. The same applies to the remaining nodes 100-2 to 100-8. Port IDs are indicated outside each of the nodes 100-1 to 100-8. For example, the Priority "HIGH" is registered for the access port "5" of the node 100-3 with reference to FIG. 3B. The Transmission and reception setting "OFF" is registered for the ring port "1" of the node 100-3 and the Transmission and reception setting "ON" is set for the ring port "2" of the node 100-3 with reference to FIG. 3A. Accordingly, a data frame F flowing into the node 100-3 through the access port "5" is relayed to the node 100-4 through the ring port "2". Then, the data frame F flows out from the relay system S through the access port "5" of the node 100-6. A data frame f flows into the relay system S and flows out from the relay system S in a similar manner. As described above, the Transmission and reception settings "ON" and "OFF" and the Priorities "HIGH" and "LOW" are used to set the communication path R1 that is alleviated when a communication failure occurs and the communication path R2 that is not alleviated when a communication failure occurs. The communication path R1 having the Priority "HIGH" and the communication path R2 having the Priority "LOW" are set so as not to be overlapped with each other. Accordingly, users of a number exceeding the maximum number of VLANs are capable of using the relay system S. The ring port "1" of each node is coupled to the ring port "2" of the adjacent node.

Figure 4:
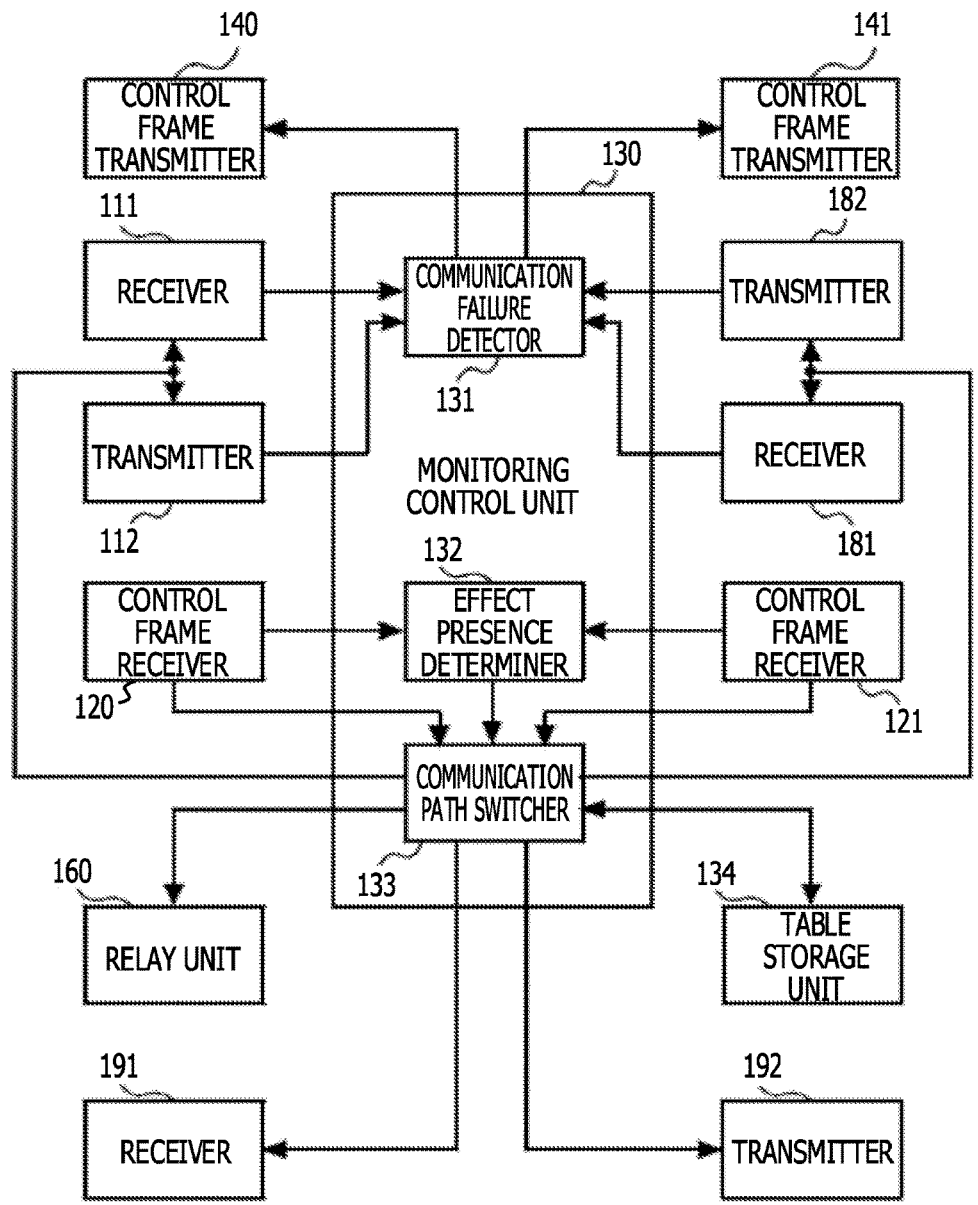
FIG. 4 is a block diagram illustrating an exemplary configuration of a monitoring control unit.

The monitoring control unit 130 described above will now be described in detail with reference to FIG. 4. FIG. 4 is a block diagram illustrating an exemplary configuration of the monitoring control unit 130. Referring to FIG. 4, the monitoring control unit 130 includes a communication failure detector 131, an effect presence determiner 132, and a communication path switcher 133.

The communication failure detector 131 detects any communication failure with the adjacent nodes on the basis of the communication states transmitted from the receivers 111 and 181 and the transmitters 112 and 182. For example, a communication failure is detected if the optical communication with the receiver 111 or 181 or the transmitter 112 or 182 is disabled due to, for example, disconnection of the optical fiber cable 201 or 202 or contamination of the optical fiber cable to cause the communication state not to be transmitted. Upon detection of a communication failure, the communication failure detector 131 causes the control frame transmitter 141 or 141 to generate the control frame. For example, when the communication state is transmitted from the receiver 111 or the transmitter 112, the communication failure detector 131 causes the control frame transmitter 140 to generate the control frame. When the communication state is transmitted from the receiver 181 or the transmitter 182, the communication failure detector 131 causes the control frame transmitter 141 to generate the control frame.

The effect presence determiner 132 determines whether the data frame relayed by the relay unit 160 is affected by the communication failure for every VLAN on the basis of pieces of information stored in a first control frame if the control frame received by the control frame receiver 120 or 121 is the first control frame and the information stored in the last node is stored in the first control frame. The first control frame stores the pieces of information that are collected from the nodes 100-1 to 100-8.

The communication path switcher 133 switches the communication path that is set in the VLAN determined to be affected by the communication failure by the effect presence determiner 132 on the basis of priority information as the priority used for determining the communication path to be alleviated by priority, among the pieces of information stored in the first control frame. For example, the communication path switcher 133 updates the content of registration in the ring port table and the access port table stored in a table storage unit 134. In addition, the communication path switcher 133 switches between reception and stop of the reception of the data frame by the receivers 111, 181, and 191 and between transmission and stop of the transmission of the data frame by the transmitters 112, 182, and 192. The above processing causes the communication path of the data frame to be switched for every VLAN.

Figure 5:
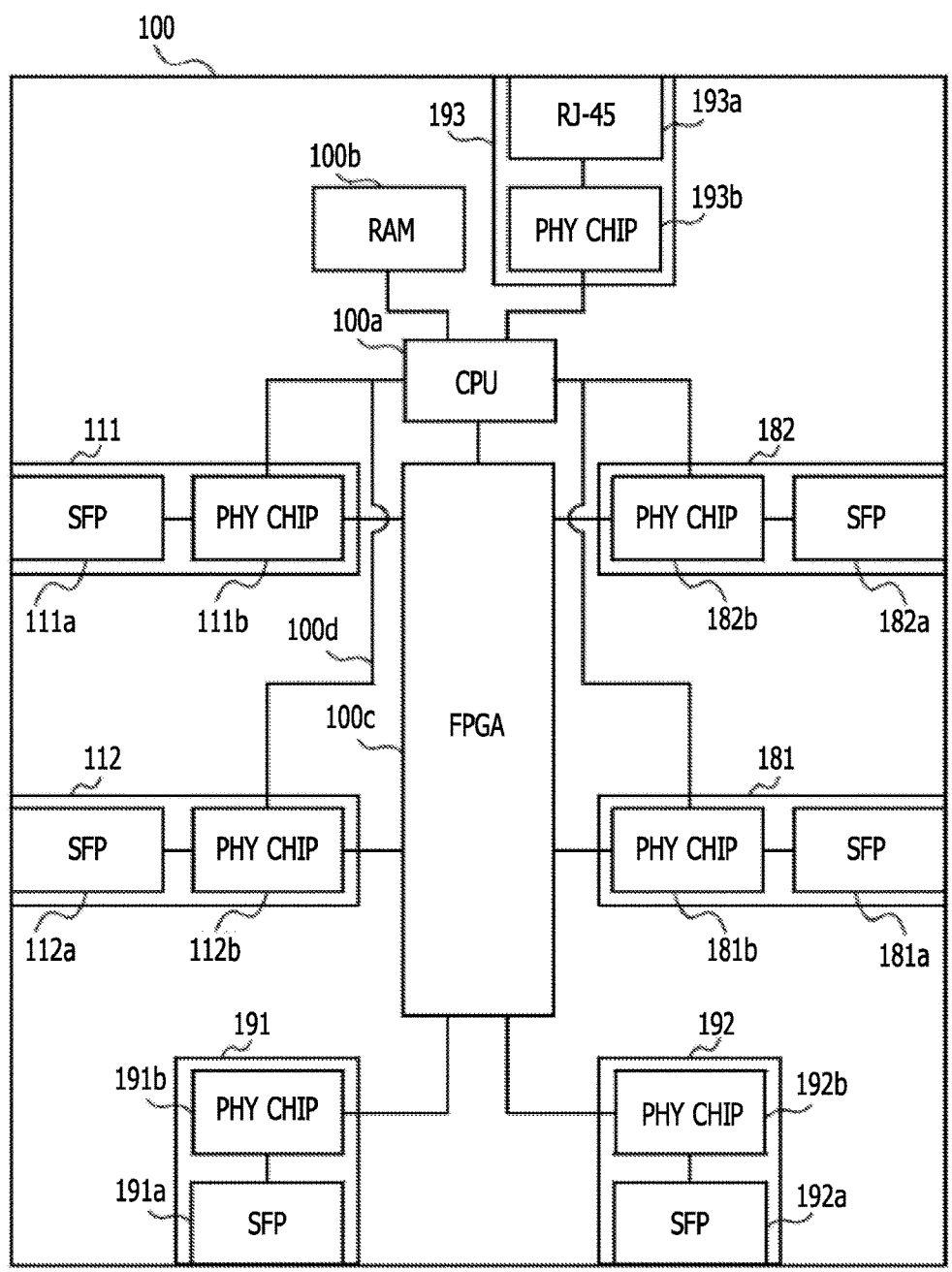
FIG. 5 illustrates an exemplary hardware configuration of the node.

The hardware configuration of the node 100 described above will now be described with reference to FIG. 5. FIG. 5 illustrates an example of the hardware configuration of the node 100. Referring to FIG. 5, the node 100 includes a central processing unit (CPU) 100a, a random access memory (RAM) 100b, and a field programmable gate array (FPGA) 100c. The node 100 also includes small form factor pluggables (SPFs) 111a, 112a, 181a, 182a, 191a, and 192a; physical layer chips (PHY chips) 111b, 112b, 181b, 182b, 191b, 192b, and 193b; and a registered jack 45 (RJ-45) 193a. These components are coupled to a communication path 100d through which an electrical signal is transmitted. At least the CPU 100a and the RAM 100b cooperate to realize a computer.

Specifically, the RAM 100b reads out programs stored in, for example, a read only memory (ROM). The programs that are read out are executed by the CPU 100a to realize the functions of the communication failure detector 131, the effect presence determiner 132, and the communication path switcher 133 in the monitoring control unit 130. The programs that are read out are executed by the CPU 100a to realize operations by the node 100 described below. The control programs may correspond to flowcharts described below. The various tables described above are stored in the RAM 100b.

The SPFs 111a and 182a are coupled to the optical fiber cable 201. The SPFs 112a and 181a are coupled to the optical fiber cable 202. The SPFs 191a and 192a are coupled to an optical fiber cable coupled to an apparatus outside the system. The SPFs 111a, 112a, 181a, 182a, 191a, and 192a each convert an optical signal into an electrical signal and each convert an electrical signal into an optical signal.

The PHY chips 111b, 112b, 181b, 182b, 191b, 192b, and 193b each convert an analog electrical signal into a digital-format frame and each convert a digital-format frame into an analog electrical signal. The PHY chips 111b, 112b, 181b,

182b, 191b, 192b, and 193b each determine whether a frame is the control frame. In addition, the PHY chips 111b, 112b, 181b, 182b, 191b, 192b, and 193b each transmit and receive a frame and each stop the transmission and reception of the frame under the control of the CPU 100a.

The RJ-45 193a is coupled to, for example, one end of a LAN cable. The OSS 300 is coupled to the other end of the LAN cable.

The FPGA 100c is subjected to design-based programming to realize the functions of the control frame receivers 120 and 121, the control frame transmitters 140 and 141, the divider-for-every-VLAN 150, the integrator-for-every-VLAN 151, the divider-for-every-VLAN 152, the relay unit 160, the integrator-for-every-VLAN 170, the divider-for-every-VLAN 171, and the integrator-for-every-VLAN 172.

Exemplary operations of the node 100 upon occurrence of a communication failure will be described.

An exemplary operation of the node 100 that has detected a communication failure will now be described with reference to FIG. 6 to FIG. 8.

Figure 6:
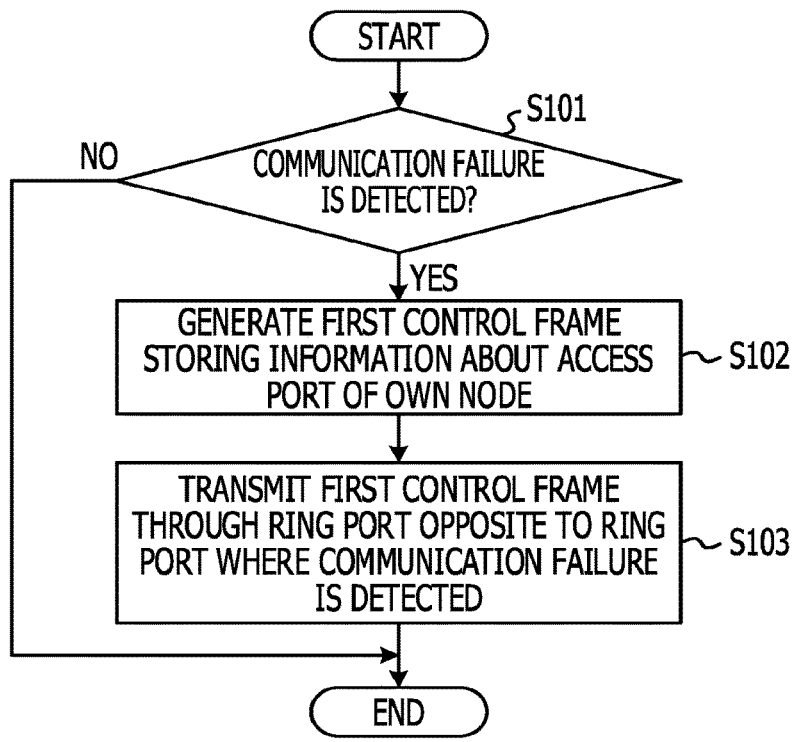
FIG. 6 is a flowchart illustrating an exemplary process executed by the node that has detected a communication failure.

FIG. 6 is a flowchart illustrating an exemplary process executed by the node 100 that has detected a communication failure. FIG. 7A, FIG. 7B, FIG. 7C, and FIG. 7D are diagrams for describing the effects on the frames F and f upon occurrence of a communication failure for every VLAN. FIG. 8 illustrates an exemplary format of the first control frame.

Referring to FIG. 6, in S101, the communication failure detector 131 determines whether a communication failure is detected. As described above, the detection of a communication failure is based on the communication state transmitted from the receiver 111 or 181 or the transmitter 112 or 182. For example, as illustrated in FIG. 7A to FIG. 7D, upon occurrence of a communication failure between the node "4" and the node "5", the communication failure is detected through the ring port "2" (refer to FIG. 3C) of the node "4". The communication failure may be detected through the ring port "1" of the node "5". If no communication failure is detected by the communication failure detector 131 (NO in S101), the process illustrated in FIG. 6 is terminated. If a communication failure is detected by the communication failure detector 131 (YES in S101), in S102, the control frame transmitter 141 generates the first control frame in which information about the access port of the own node is stored.

The first control frame generated by the control frame transmitter 141 includes a destination address (DA) field, a source address (SA) field, the VLAN tag field, a Type field, a Data field, and a frame check sequence (FCS) field, as illustrated in FIG. 8. In particular, the type value stored in the VLAN tag field is used to determine the type of the control frame. For example, since a type value "0xfff4" is allocated to the first control frame, the receivers 111 and 181 each determine that the received frame is the first control frame on the basis of the type value. Tag control information specified in the VLAN tag field is used to identify the VLAN ID. In addition, the receivers 111 and 181 each use a variety of information stored in the Data field to determine whether the frame is the last frame and determine, for example, connection information on each communication path.

Upon completion of S102, in S103, the control frame transmitter 141 transmits the first control frame through the ring port opposite to the ring port where the communication failure is detected. For example, upon detection of the communication failure at the ring port "2" of the node "4", as illustrated in FIG. 7A to FIG. 7D, the first control frame is transmitted through the ring port "1" of the node "4". In other words, the first control frame is transmitted by the transmitter 112 in the node "4".

Figure 7A:
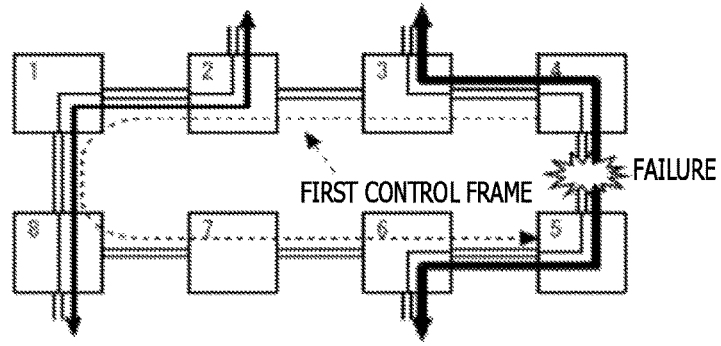
FIG. 7A, FIG. 7B, FIG. 7C, and FIG. 7D are diagrams for describing the effects on frames upon occurrence of the communication failure for every VLAN.
Figure 7B:
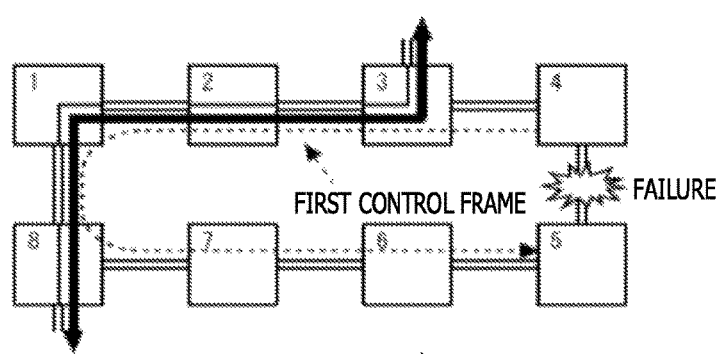
Figure 7C:
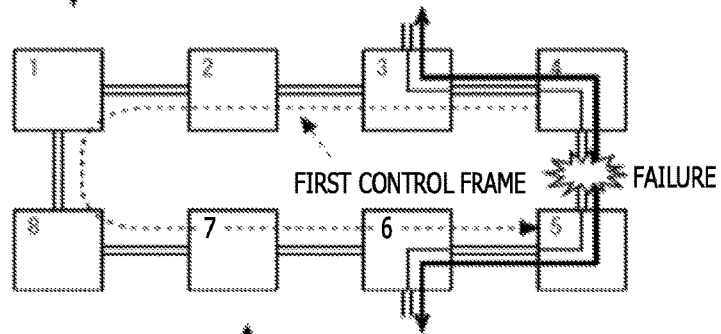
Figure 7D:
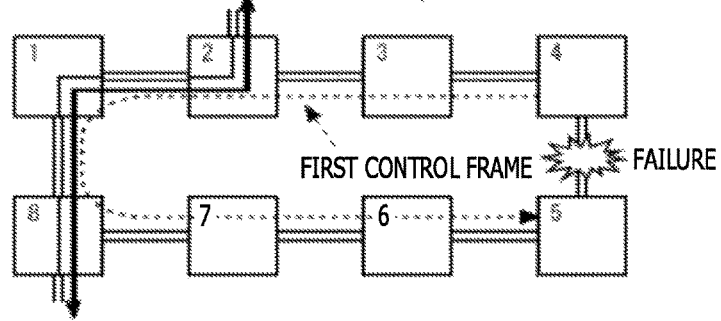

Upon occurrence of the communication failure, the communication path that is affected by the communication failure is varied with the VLAN (the communication path R1 or R2 (or the frame F or f) is affected by the communication failure depending on the VLAN), as illustrated in FIG. 7A to FIG. 7D. For example, in the case of the VLAN "100", the communication path R1 (or the frame F) is affected by the communication failure but the communication path R2 (or the frame f) is not affected by the communication failure, as illustrated in FIG. 7A. In the case of a VLAN "101", the communication path R1 (or the frame F) is not affected by the communication failure, as illustrated in FIG. 7B. In the case of a VLAN "102", the communication path R2 (or the frame f) is affected by the communication failure, as illustrated in FIG. 7C. In the case of a VLAN "103", the communication path R2 (or the frame f) is not affected by the communication failure, as illustrated in FIG. 7D. Accordingly, switching between the communication paths R1 and R2 only in the VLANs affected by the communication failure allows the VLANs that are not affected by the communication failure to be continuously used without the effect of temporary disconnection involved in the switching.

An exemplary operation of the node 100 that has received the first control frame will now be described with reference to FIG. 9 to FIG. 11B.

Figure 9:
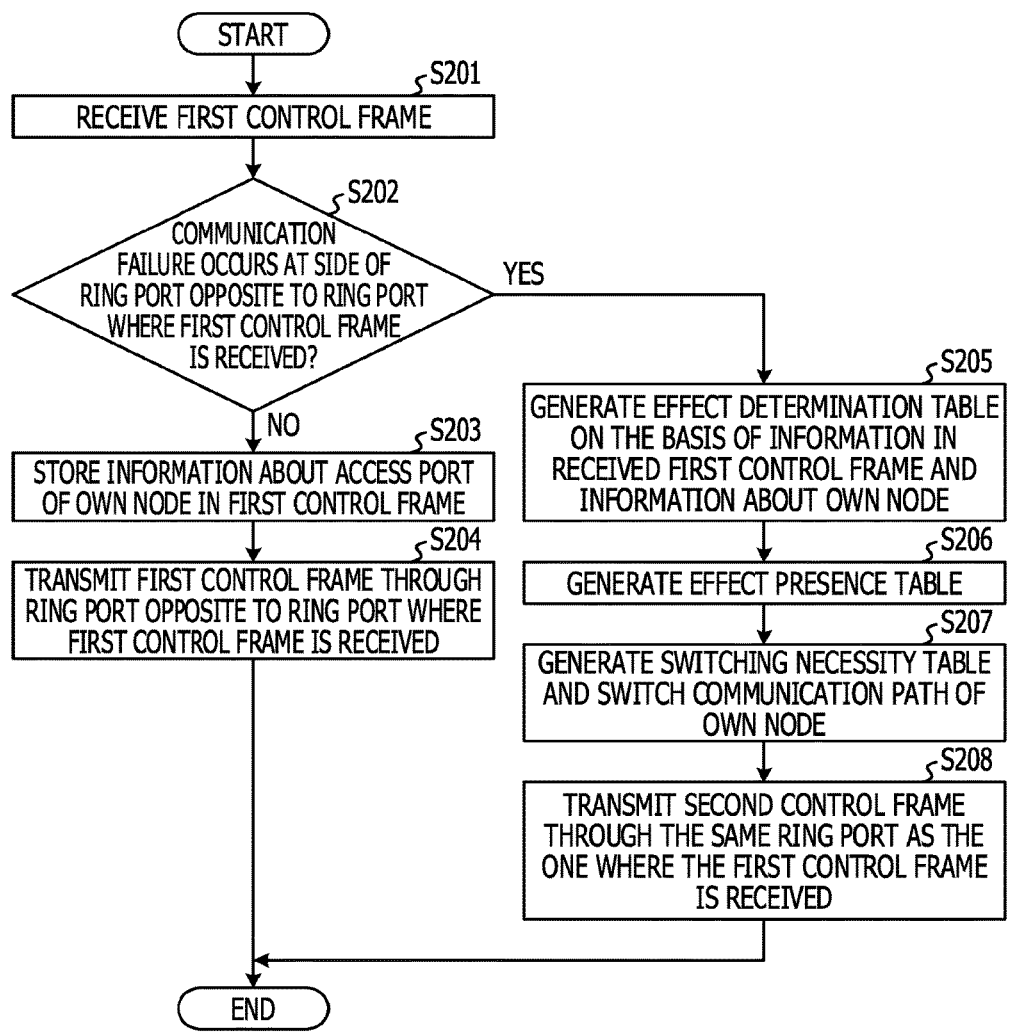
FIG. 9 is a flowchart illustrating an exemplary process executed by the node that has received the first control frame.

FIG. 9 is a flowchart illustrating an exemplary process executed by the node 100 that has received the first control frame. FIG. 10A illustrates an example of the Data field of the first control frame. FIG. 10B illustrates another example of the Data field of the first control frame. FIG. 10C illustrates an example of the effect determination table. FIG. 11A illustrates an example of the effect presence table. FIG. 11B illustrates an example of the switching necessity table.

Referring to FIG. 9, in S201, the control frame receiver 121 receives the first control frame. Specifically, the receiver 181 receives the frame to determine whether the received frame is the control frame. If the frame received by the receiver 181 is the control frame, the control frame transmitted from the receiver 181 is received by the control frame receiver 121. Whether the frame is the control frame and the type of the control frame are determined on the basis of the information stored in the VLAN tag field of the frame.

When a communication failure is detected in the node "4", the first control frame transmitted from the node "4" stores a variety of information stored in the node "4", as illustrated in FIG. 10A. The priority is not set in any of the VLAN "100" to the VLAN "103" in the node "4". Accordingly, Priority "0" indicating that the priority is not set is stored in the first control frame. Information "YES" indicating that the information about the node "4" is stored is stored in the first control frame. In contrast, the first control frame does not reach the nodes "1" to "3" and the nodes "5" to "8" other than the node "4". Accordingly, information "NO" indicating that no information is stored is stored in the first control frames of the nodes "1" to "3" and the nodes "5" to "8".

Upon reception of the first control frame by the control frame receiver 121, in S202, the effect presence determiner 132 determines whether a communication failure occurs at the side of the ring port opposite to the ring port where the first control frame is received. For example, when the first control frame is transmitted from the node "4" and the adjacent node "3" receives the first control frame (refer to FIG. 7A to FIG. 7D), no communication failure occurs at the side of the ring port "1" opposite to the ring port "2" (refer to FIG. 3C) of the node "3" where the first control frame is received. Accordingly, the effect presence determiner 132 determines that no communication failure occurs at the side of the ring port opposite to the ring port where the first control frame is received (NO in S202).

In S203, the effect presence determiner 132 stores the information about the access port of the own node in the first control frame. As a result, the information that is stored in the node "3" is additionally stored in the first control frame where the information about the node "4" is stored. In S204, the control frame transmitter 141 transmits the first control frame through the ring port opposite to the ring port where the first control frame is received. For example, when the first control frame is received through the ring port "2" of the node "3", the first control frame is transmitted through the ring port "1" of the node "3", as illustrated in FIG. 7A to FIG. 7D. In other words, the first control frame is transmitted from the transmitter 112 of the node "3" to the node "2".

As described above, the first control frame is relayed while the first control frame sequentially collects the pieces of information stored in the nodes "2", "1", "8", "7", and "6". In other words, the first control frame circles around in the relay system S. When the node "5" receives the first control frame, the pieces of information about the nodes "1" to "4" and the nodes "6" to "8" are stored in the first control frame, as illustrated in FIG. 10B. For example, in the VLAN "100", the node "3" has the access port in which the Priority "HIGH" is registered and which is coupled to the ring port "2". The node "2" has the access port in which the Priority "LOW" is registered and which is coupled to the ring port "1". The node "5" receives the first control frame storing the above information.

Upon reception of the first control frame by the node "5", as described above, in S202, the effect presence determiner 132 determines whether a communication failure occurs at the side of the ring port opposite to the ring port where the first control frame is received. When the first control frame is received at the ring port "2" of the node "5", a communication failure occurs at the ring port "1" opposite to the ring port "2". In this case, the effect presence determiner 132 determines that a communication failure occurs at the side of the ring port opposite to the ring port where the first control frame is received (YES in S202).

In S205, the effect presence determiner 132 generates the effect determination table on the basis of the information in the received first control frame and information about the own node. The effect determination table includes the information stored in the first control frame and the information stored in the node "5", as illustrated in FIG. 10C. The effect determination table is used to identify the communication paths R1 and R2 set in the relay system S for every VLAN. In other words, the effect determination table illustrated in FIG. 10C represents the communication paths R1 and R2 set for every VLAN illustrated in FIG. 7A to FIG. 7D.

In S206, the effect presence determiner 132 generates the effect presence table. Specifically, the effect presence table is generated on the basis of the effect determination table and a determination method 1 described below. The effect presence table includes columns of VLAN, High priority, and Low priority, as illustrated in FIG. 11A. The High priority represents the communication path R1 having the Priority "HIGH". The Low priority represents the communication path R2 having the Priority "LOW". Whether the communication paths R1 and R2 are affected or not is indicated by "YES" or "NO", respectively, for every VLAN.

[Determination Method 1]

When the first control frame is received through the ring port "2", in each VLAN, (A) the effect presence table is searched from the left side and "YES" is registered in the High priority if the Priority "HIGH" is sequentially stored in the ring port "2" and the ring port "1", (B) the effect presence table is searched from the left side and "NO" is registered in the High priority if the Priority "HIGH" is sequentially stored in the ring port "1" and the ring port "2", (C) the effect presence table is searched from the left side and "YES" is registered in the Low priority if the Priority "LOW" is sequentially stored in the ring port "2" and the ring port "1", and (D) the effect presence table is searched from the left side and "NO" is registered in the Low priority if the Priority "LOW" is sequentially stored in the ring port "1" and the ring port "2".

When the first control frame is received through the ring port "1", the determination may be made in the opposite storage order in the determination method 1.

In S207, the effect presence determiner 132 generates the switching necessity table and the communication path switcher 133 switches the communication path of the own node. Specifically, the switching necessity table is generated on the basis of the effect presence table and a determination method 2 described below. The switching necessity table includes columns of VLAN and Switching necessity, as illustrated in FIG. 11B. "SWITCHING" or "NO-SWITCHING" is registered for the communication paths R1 and R2 for every VLAN.

[Determination Method 2]

In each VLAN, (A) "SWITCHING" is registered if the High priority of the effect presence table is set to "YES", (B) "SWITCHING" is registered if the High priority of the effect presence table is set to "NO" and the Low priority thereof is set to "YES", and (C) "NO-SWITCHING" is registered if the High priority of the effect presence table is set to "NO" and the Low priority thereof is set to "NO".

In other words, "SWITCHING" is registered if either of the High priority and the Low priority of the effect presence table is set to "YES".

Upon generation of the switching necessity table, the communication path switcher 133 switches the communication path of the own node. Specifically, the communication path switcher 133 updates the Transmission and reception setting of the ring port at the side where the communication failure occurs, in the ring port table of the own node (for example, the node "5"), to "OFF" and updates the Change status to "CHANGED", as illustrated in FIG. 14B described below. The communication path switcher 133 stops the transmission and reception through the ring port at the side where the communication failure occurs on the basis of the updated ring port table. The switching of the communication path stops the transmission of the frame to the side where the communication failure occurs.

Upon completion of S207, in S208, the control frame transmitter 141 transmits a second control frame through the same ring port as the one where the first control frame is received. For example, when the first control frame is received through the ring port "2" of the node "5", the second control frame is transmitted through the ring port "2".

An exemplary operation of the node 100 that has received the second control frame will now be described with reference to FIG. 12 to FIG. 14C.

Figure 12:
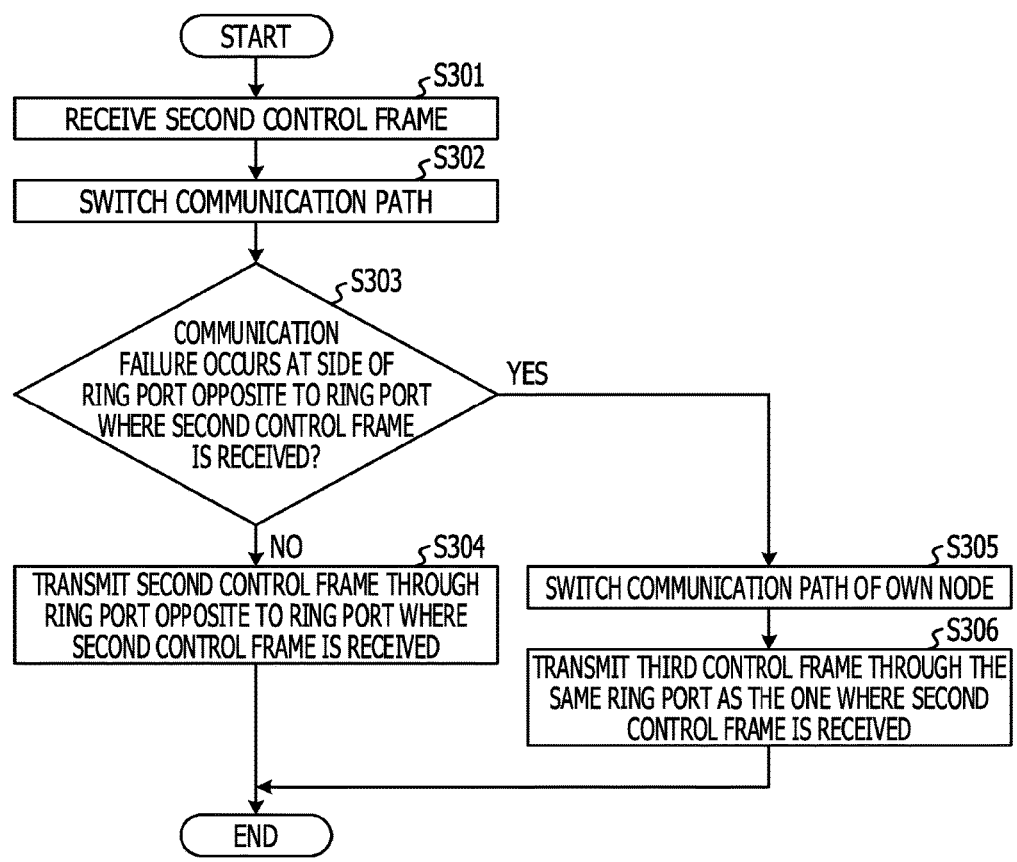
FIG. 12 is a flowchart illustrating an exemplary process executed by the node that has received a second control frame.

FIG. 12 is a flowchart illustrating an exemplary process executed by the node 100 that has received the second control frame. FIG. 13 illustrates an exemplary format of the second to fifth control frames. FIG. 14A illustrates an example of the communication path that is set. FIG. 14B illustrates an example of the ring port table. FIG. 14C illustrates an example of the access port table.

Referring to FIG. 12, in S301, the control frame receiver 121 receives the second control frame. The reception of the second control frame by the control frame receiver 121 is performed in the same manner as in the first control frame described above.

The second control frame transmitted by the control frame transmitter 141 includes a destination address (DA) field, a source address (SA) field, the VLAN tag field, a Type field, a Data field, and a frame check sequence (FCS) field, as illustrated in FIG. 13. In particular, the type values stored in the VLAN tag field is used to determine the types of the control frames. For example, since a type value "0xfff0" is allocated to the second control frame, the receivers 111 and 181 each determine that the received frame is the second control frame on the basis of the type value. The third to fifth control frames described below are determined in the same manner with type values "0xfff1", "0xfff2", and "0xfff3" allocated to the third to fifth control frames, respectively. Switching necessity information and return necessity information are stored in the Data field. The switching necessity information is registered in the switching necessity table. The return necessity information is used to return the communication path switched on the basis of the switching necessity information.

Upon reception of the second control frame by the control frame receiver 121, in S302, the communication path switcher 133 switches the communication path. Specifically, the communication path switcher 133 updates the ring port table and the access port table of the VLAN the Switching necessity of which is "SWITCHING" on the basis of the switching necessity information. In addition, the communication path switcher 133 switches the transmission and reception of the receivers 111, 181, and 191 and the transmitters 112, 182, and 192 on the basis of the ring port table and the access port table that are updated.

For example, as illustrated in FIG. 14A, when the second control frame is transmitted from the node "5", the node "6" first receives the second control frame. Since the Priority "HIGH" is registered in the access port "5" with reference to the access port table of the node "6", as illustrated in FIG. 14C, the communication path switcher 133 does not update the access port table. The second control frame sequentially circles around the nodes and the node "8" receives the second control frame. The Priority "LOW" is registered in the access port "4" of the node "8". Accordingly, the communication path switcher 133 updates the access port table. Specifically, the communication path switcher 133 changes the Transmission and reception setting of the access port "4" from "ON" to "OFF", as illustrated in FIG. 14C. Then, the communication path switcher 133 stops the transmission and reception through the access port "4". In other words, the transmission and reception of the frame f by the receiver and the transmitter included in the second access port is stopped. As a result, the input of the frame f into the node "8" is stopped, as illustrated in FIG. 14A.

As described above, the second control frame sequentially circles around the nodes. If the Priority "LOW" is registered in the access port table of the VLAN the Switching necessity of which is "SWITCHING", the second control frame changes the Transmission and reception setting from "ON" to "OFF". Then, the communication path switcher 133 stops the transmission and reception through the corresponding access port. As a result, the input of the frame f into the relay system S is stopped, as illustrated in FIG. 14A.

Upon switching of the communication path by the communication path switcher 133, in S303, the effect presence determiner 132 determines whether a communication failure occurs at the side of the ring port opposite to the ring port where the second control frame is received. For example, as illustrated in FIG. 14A, no communication failure occurs at the side of the ring port opposite to the ring port where the second control frame is received in the nodes "1" to "3" and the nodes "6" to "8". If the effect presence determiner 132 determines that no communication failure occurs at the side of the ring port opposite to the ring port where the second control frame is received (NO in S303), in S304, the control frame transmitter 141 transmits the second control frame through the ring port opposite to the ring port where the second control frame is received.

In contrast, a communication failure occurs at the side of the ring port opposite to the ring port where the second control frame is received in the node "4". If the effect presence determiner 132 determines that a communication failure occurs at the side of the ring port opposite to the ring port where the second control frame is received (YES in S303), in S305, the communication path switcher 133 switches the communication path of the own node. Specifically, as illustrated in FIG. 14B, in the ring port table of the own node, the Transmission and reception setting of the ring port at the side where the communication failure occurs is updated to "OFF" and the Change status thereof is updated to "CHANGED". The communication path switcher 133 stops the transmission and reception through the ring port at the side where the communication failure occurs on the basis of the ring port table that is updated. The switching of the communication path stops the transmission of the frame to the side where the communication failure occurs.

Upon switching of the communication path by the communication path switcher 133, in S306, the control frame transmitter 141 transmits the third control frame through the same ring port as the one where the second control frame is received. For example, when the second control frame is received through the ring port "1" of the node "4", the third control frame is transmitted through the ring port "1".

An exemplary operation of the node 100 that has received the third control frame will now be described with reference to FIG. 15 and FIG. 16A to FIG. 16C.

Figure 15:
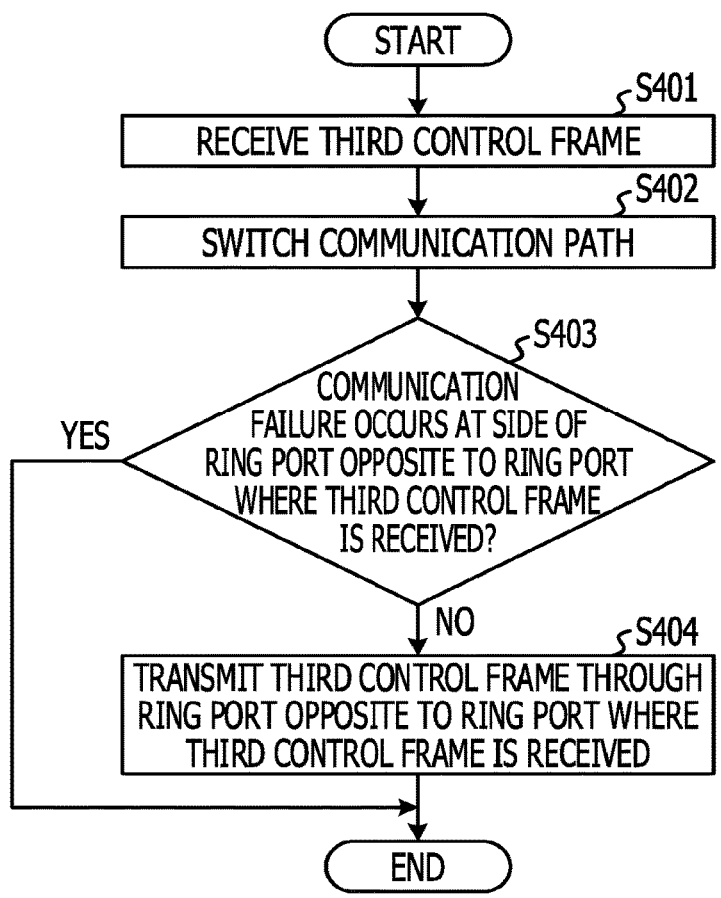
FIG. 15 is a flowchart illustrating an exemplary process executed by the node that has received the third control frame.

FIG. 15 is a flowchart illustrating an exemplary process executed by the node 100 that has received the third control frame. FIG. 16A illustrates an example of the communication path that is set. FIG. 16B illustrates an example of the ring port table. FIG. 16C illustrates an example of the access port table.

Referring to FIG. 15, in S401, the control frame receiver 121 receives the third control frame. The reception of the third control frame by the control frame receiver 121 is performed in the same manner as in the first control frame and the second control frame described above.

Upon reception of the third control frame by the control frame receiver 121, in S402, the communication path switcher 133 switches the communication path. Specifically, the communication path switcher 133 updates the ring port table of the VLAN the Switching necessity of which is "SWITCHING" on the basis of the switching necessity information. In addition, the communication path switcher 133 switches the transmission and reception of the receivers 111 and 181 and the transmitters 112 and 182 on the basis of the ring port table that is updated.

For example, as illustrated in FIG. 16A, when the third control frame is transmitted from the node "4", the node "3" first receives the third control frame. Since the Transmission and reception setting "OFF" is registered in the ring port table of the node "3", the communication path switcher 133 updates the ring port table. Specifically, as illustrated in FIG. 16B, the Transmission and reception setting of the ring port "1" of the node "3" is changed from "OFF" to "ON" and the Change status thereof is updated to "CHANGED". Then, the communication path switcher 133 enables the transmission and reception through the ring port "1". As a result, the frame F is transmitted to the node "2", as illustrated in FIG. 16A.

Upon switching of the communication path by the communication path switcher 133, in S403, the effect presence determiner 132 determines whether a communication failure occurs at the side of the ring port opposite to the ring port where the third control frame is received. For example, as illustrated in FIG. 16A, no communication failure occurs at the side of the ring port opposite to the ring port where the third control frame is received in the nodes "1" to "3" and the nodes "6" to "8". If the effect presence determiner 132 determines that no communication failure occurs at the side of the ring port opposite to the ring port where the third control frame is received (NO in S403), in S404, the control frame transmitter 141 transmits the third control frame through the ring port opposite to the ring port where the third control frame is received. If the effect presence determiner 132 determines that a communication failure occurs at the side of the ring port opposite to the ring port where the third control frame is received (YES in S403), the process illustrated in FIG. 15 is terminated.

As described above, the third control frame sequentially circles around the nodes. If "OFF" is registered in the Transmission and reception setting in the ring port table in the VLAN the Switching necessity of which is "SWITCHING", all the Transmission and reception settings are changed from "OFF" to "ON". Then, the communication path switcher 133 enables the transmission and reception through the corresponding ring port. As a result, as illustrated in FIG. 16A, the frame F flowing into the relay system S from an apparatus outside the system is relayed to another apparatus outside the system along a communication path different from the communication path R1 before the switching. In contrast, since the communication path is not switched in the VLAN the Switching necessity of which is "NO-SWITCHING", the temporary disconnection on the communication path involved in the switching does not occur and it is possible to continuously use the relay system S. Since the first control frame, the second control frame, and the third control frame sequentially circle around in this order, it is possible to avoid an occurrence of the flowing of the frame of a user who uses the communication path having the low priority into the communication path having the high priority or a reverse phenomenon. In addition, keeping this order also avoids the frame that makes a loop in the relay system S.

An exemplary operation of the node 100 when the communication failure is recovered will now be described.

Figure 17:
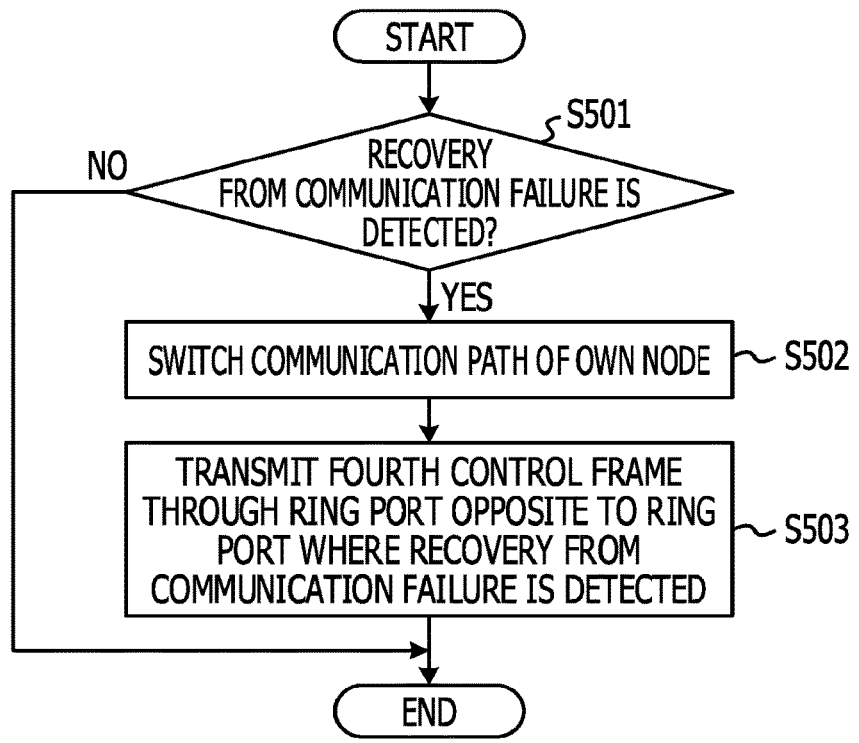
FIG. 17 is a flowchart illustrating an exemplary process executed by the node that has detected recovery of the communication failure.

FIG. 17 is a flowchart illustrating an exemplary process executed by the node 100 that has detected the recovery of the communication failure. Referring to FIG. 17, in S501, the communication failure detector 131 determines whether the recovery from the communication failure is detected. The detection of the recovery from the failure is based on the communication state transmitted from the receiver 111 or 181 or the transmitter 112 or 182. For example, upon recovery from the communication failure between the node "4" and the node "5", the recovery from the communication failure is detected through the ring port "2" of the node "4". The recovery from the communication failure may be detected through the ring port "1" of the node "5". If the recovery from the communication failure is not detected by the communication failure detector 131 (NO in S501), the process illustrated in FIG. 17 is terminated.

If the recovery from the communication failure is detected by the communication failure detector 131 (YES in S501), in S502, the communication path switcher 133 switches the communication path of the own node. Specifically, when the Change status of the ring port at the side where the communication failure is recovered is "CHANGED" in the ring port table of the own node (for example, the node "4"), the Transmission and reception setting is changed from "OFF" to "ON" and the Change status is changed from "CHANGED" to "UNCHANGED". The communication path switcher 133 enables the transmission and reception through the ring port at the side where the communication failure is recovered on the basis of the ring port table that is updated. The switching of the communication path causes the frame F to be transmitted to the side where the communication failure is recovered.

Upon switching of the communication path by the communication path switcher 133, in S503, the control frame transmitter 141 transmits the fourth control frame through the ring port opposite to the ring port where the recovery from the communication failure is detected. For example, when the recovery from the communication failure is detected at the ring port "2" of the node "4", the fourth control frame is transmitted through the ring port "1" of the node "4". In other words, the fourth control frame is transmitted from the transmitter 112 in the node "4".

An exemplary operation of the node 100 that has received the fourth control frame will now be described with reference to FIG. 18 and FIG. 19A to FIG. 19C.

Figure 18:
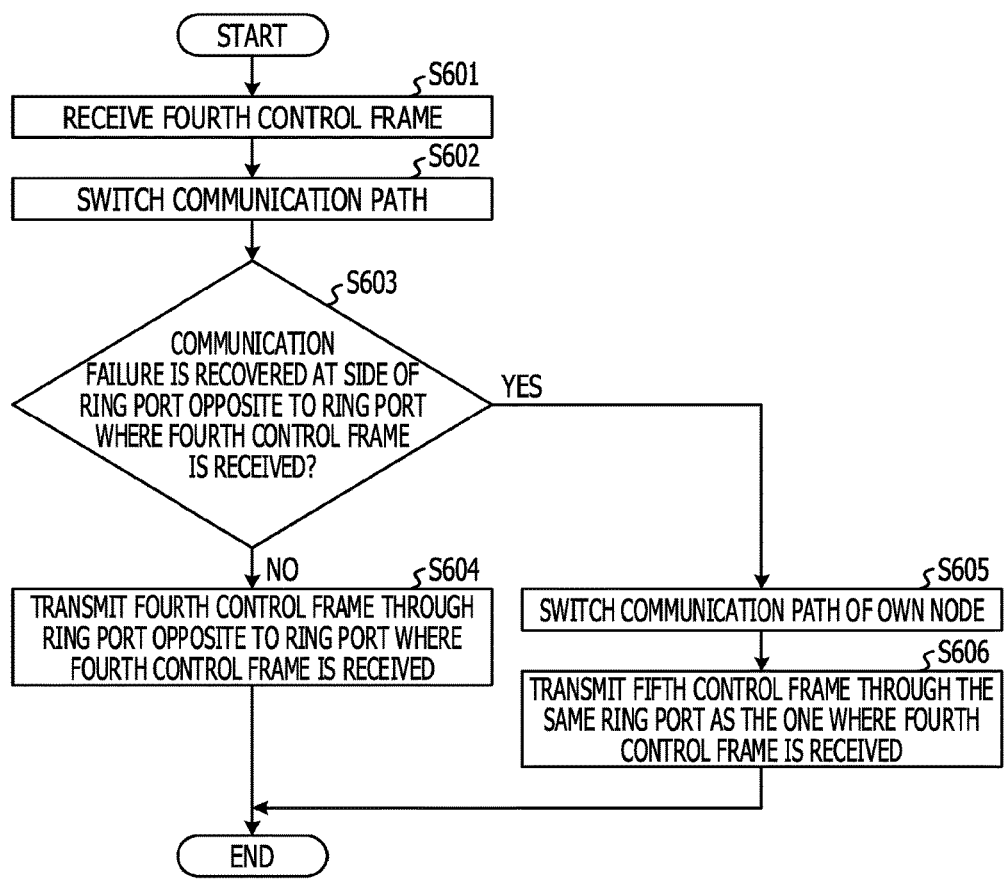
FIG. 18 is a flowchart illustrating an exemplary process executed by the node that has received the fourth control frame.

FIG. 18 is a flowchart illustrating an exemplary process executed by the node 100 that has received the fourth control frame. FIG. 19A illustrates an example of the communication path that is set. FIG. 19B illustrates an example of the ring port table. FIG. 19C illustrates an example of the access port table.

Referring to FIG. 18, in S601, the control frame receiver 121 receives the fourth control frame. The reception of the fourth control frame by the control frame receiver 121 is performed in the same manner as in the first to third control frames described above.

Upon reception of the fourth control frame by the control frame receiver 121, in S602, the communication path switcher 133 switches the communication path. Specifically, the communication path switcher 133 updates the ring port table of the VLAN subjected to the switching on the basis of the return necessity information. In addition, the communication path switcher 133 switches the transmission and reception of the receivers 111 and 181 and the transmitters 112 and 182 on the basis of the ring port table that is updated.

For example, as illustrated in FIG. 19A, when the fourth control frame is transmitted from the node "4", the node "3" first receives the fourth control frame. Since the Change status "CHANGED" is registered in the ring port table of the node "3", the communication path switcher 133 updates the ring port table. Specifically, as illustrated in FIG. 19B, the Transmission and reception setting of the ring port "1" of the node "3" is changed from "ON" to "OFF" and the Change status thereof is updated to "UNCHANGED". Then, the communication path switcher 133 stops the transmission and reception through the ring port "1". As a result, the transmission of the frame F to the node "2" is stopped, as illustrated in FIG. 19A.

Upon switching of the communication path by the communication path switcher 133, in S603, the effect presence determiner 132 determines whether the communication failure is recovered at the side of the ring port opposite to the ring port where the fourth control frame is received. For example, as illustrated in FIG. 19A, no communication failure occurs at the side of the ring port opposite to the ring port where the fourth control frame is received in the nodes "1" to "3" and the nodes "6" to "8". If the effect presence determiner 132 determines that no communication failure occurs at the side of the ring port opposite to the ring port where the fourth control frame is received (NO in S603), in S604, the control frame transmitter 141 transmits the fourth control frame through the ring port opposite to the ring port where the fourth control frame is received.

In the node "5", the communication failure is recovered at the side of the ring port opposite to the ring port where the fourth control frame is received. If the effect presence determiner 132 determines that the communication failure is recovered at the side of the ring port opposite to the ring port where the fourth control frame is received (YES in S603), in S605, the communication path switcher 133 switches the communication path of the own node. Specifically, on the basis of the Change status "CHANGED", the Transmission and reception setting of the ring port at the side where the communication failure is recovered is updated to "ON" and the Change status thereof is updated to "UNCHANGED" in the ring port table of the own node, as illustrated in FIG. 19B. The communication path switcher 133 enables the transmission and reception through the ring port at the side where the communication failure is recovered on the basis of the ring port table that is updated. The switching of the communication path causes the frame F to be transmitted to the side where the communication failure is recovered.

Upon switching of the communication path by the communication path switcher 133, in S606, the control frame transmitter 141 transmits the fifth control frame through the same ring port as the one where the fourth control frame is received. For example, when the fourth control frame is received through the ring port "2" of the node "5", the fifth control frame is transmitted through the ring port "2".

As described above, the fourth control frame sequentially circles around the nodes and the Transmission and reception setting in the ring port table in the VLAN subjected to the switching is updated on the basis of the Change status "CHANGED". For example, the Transmission and reception setting is updated to "ON" when "OFF" is registered in the Transmission and reception setting corresponding to the Change status "CHANGED" and the Transmission and reception setting is updated to "OFF" when "ON" is registered in the corresponding Transmission and reception setting. After the update, the Change status is updated to "UNCHANGED". The communication path switcher 133 enables or stops the transmission and reception through the corresponding ring port on the basis of the ring port table that is updated. As a result, as illustrated in FIG. 19A, the frame F flowing into the relay system S from an apparatus outside the system is relayed to another apparatus outside the system along the communication path R1 before the communication failure occurs.

An exemplary operation of the node 100 that has received the fifth control frame will now be described with reference to FIG. 20 and FIG. 21A to FIG. 21C.

Figure 20:
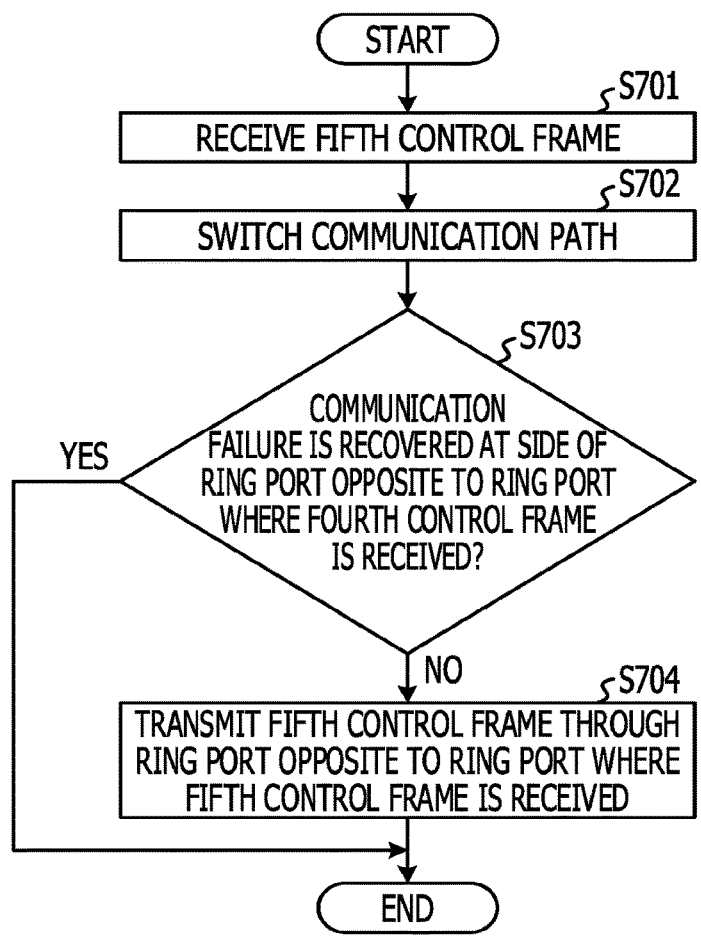
FIG. 20 is a flowchart illustrating an exemplary process executed by the node that has received the fifth control frame.

FIG. 20 is a flowchart illustrating an exemplary process executed by the node 100 that has received the fifth control frame. FIG. 21A illustrates an example of the communication path that is set. FIG. 21B illustrates an example of the ring port table. FIG. 21C illustrates an example of the access port table.

Referring to FIG. 20, in S701, the control frame receiver 120 receives the fifth control frame. The reception of the fifth control frame by the control frame receiver 120 is performed in the same manner as in the first to fourth control frames described above.

Upon reception of the fifth control frame by the control frame receiver 120, in S702, the communication path switcher 133 switches the communication path. Specifically, the communication path switcher 133 updates the access port table of the VLAN subjected to the switching on the basis of the return necessity information. In addition, the communication path switcher 133 switches the transmission and reception of the receiver 191 and the transmitter 192 on the basis of the access port table that is updated.

For example, as illustrated in FIG. 21A, when the fifth control frame is transmitted from the node "5", the node "6" first receives the fifth control frame. The Priority "HIGH" is registered at the access port "5" with reference to the access port table of the node "6", as illustrated in FIG. 21C. Accordingly, the communication path switcher 133 does not update the access port table. The fifth control frame sequentially circles around the nodes and the node "8" receives the fifth control frame. The Priority "LOW" is registered at the access port "4" with reference to the access port table of the node "8", as illustrated in FIG. 21C. Accordingly, the communication path switcher 133 updates the access port table. Specifically, the communication path switcher 133 changes the Transmission and reception setting of the access port "4" from "OFF" to "ON". Then, the communication path switcher 133 enables the transmission and reception through the access port "4". As a result, the frame f flows into the node "8", as illustrated in FIG. 21A.

Upon switching of the communication path by the communication path switcher 133, in S703, the effect presence determiner 132 determines whether the communication failure is recovered at the side of the ring port opposite to the ring port where the fifth control frame is received. For example, as illustrated in FIG. 21A, the communication failure is not recovered at the side of the ring port opposite to the ring port where the fifth control frame is received in the nodes "1" to "3" and the nodes "6" to "8". If the effect presence determiner 132 determines that the communication failure is not recovered at the side of the ring port opposite to the ring port where the fifth control frame is received (NO in S703), in S704, the control frame transmitter 141 transmits the fifth control frame through the ring port opposite to the ring port where the fifth control frame is received.

In the node "4", the communication failure is recovered at the side of the ring port opposite to the ring port where the fifth control frame is received. If the effect presence determiner 132 determines that the communication failure is recovered at the side of the ring port opposite to the ring port where the fifth control frame is received (YES in S703), the process illustrated in FIG. 20 is terminated.

As described above, the fifth control frame sequentially circles around the nodes. If the "LOW" is registered in the Priority of the access port table of the VLAN subjected to the switching, the Transmission and reception setting is changed from "OFF" to "ON". Then, the communication path switcher 133 enables the transmission and reception through the corresponding access port. As a result, as illustrated in FIG. 21A, the flowing of the frame f into the relay system S is restarted. Since the fourth control frame and the fifth control frame sequentially circle around in this order, it is possible to avoid an occurrence of the flowing of the frame of the user who uses the communication path having the low priority into the communication path having the high priority or a reverse phenomenon. In addition, keeping this order also avoids the frame that makes a loop in the relay system S.

While the present disclosure is described in terms of some specific examples and embodiments, it will be clear that the present disclosure is not limited to these specific examples and embodiments and that many changes and modified embodiments will be obvious to those skilled in the art without departing from the true spirit and scope of the embodiments. For example, although the optical fiber cables are used in the above embodiments, cables through which electrical signals are transmitted may be used. Although the two ring ports 110 and 180 and the three access ports 190 are exemplified in the above embodiments, the number of ports is not limited as long as at least three ports exist, any two ports are used as the ring ports, and at least one port is used as the access port. In addition, the direction in which each control frame circles around may be opposite to the direction described above in which the control frame circles around.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay method executed by a plurality of relay apparatuses included in a ring network that establishes a plurality of virtual area networks (VLANs), the relay method comprising:
   when a communication failure of a path among a plurality of paths of the ring network is detected, transmitting a control frame for acquiring, from each of the plurality of relay apparatuses, one or more VLANs and one or more priority levels corresponding to the one or more VLANs;
   switching each of one or more paths which is different from the failed path and related to a VLAN of the failed path, to an alternate path, based on the acquired one or more VLANs, the acquired one or more priority levels, and a location at which the communication failure is occurred;
   when another route among the one or more paths exists in the alternate path, determining whether to switch the another route based on the acquired one or more priority levels;
   switching or maintaining the another route based a result of the determining; and
   switching the failed path to the alternate path.

2. The relay method according to claim 1, wherein
   the transmitting includes
   when the communication failure is detected by a first relay apparatus of the plurality of relay apparatuses, transmitting, by the first relay apparatus, the control frame; and
   the relay method further comprising
   extracting the one or more VLANs from among the plurality of VLANs based on information collected by the control frame.

3. The relay method according to claim 2,
   wherein the one or more relay apparatuses includes an access port to access to a computer which is different from the plurality of relay apparatuses.

4. The relay method according to claim 2, further comprising
   receiving, by a second relay apparatus different from the first relay apparatus, the control frame; and
   when any priority levels are not set to a related VLAN of the second relay apparatus, storing information indicating that any priorities are not set to the related VLAN in the control frame.

5. The relay method according to claim 2, further comprising:
   generating, by a third relay apparatus which is adjacent to the first relay apparatus, first information in which a VLAN, a priority level, and information of whether the VLAN is affected by the communication failure or not are associated with each other for each of the plurality of VLANs, based on information collected by the control frame, when the control frame is received from the first relay apparatus and when the communication failure between the third relay apparatus and the first relay apparatus is detected; and
   generating second information in which a VLAN and information of whether switching of a path corresponding to the VLAN is necessary or not are associated with each other for each of the plurality of VLANs, based on the generated first information; and
   determining whether to disconnect a VLAN for each of the plurality of VLANs by referring to the second information.

6. The relay method according to claim 5, further comprising:
   transmitting, by the third relay apparatus, an instruction frame for instructing another relay apparatuses in the ring network to disconnect or maintain the plurality of VLANs based on the second information.

7. The relay method according to claim 6,
   wherein a destination of the instruction frame is the first relay apparatus.

8. A management apparatus that manages a plurality of relay apparatuses included in a ring network that establishes a plurality of virtual area networks (VLANs), the management apparatus comprising:
   a memory; and
   a processor coupled to the memory and configured to:
   when a communication failure of a path among a plurality of paths of the ring network is detected, transmit a control frame for acquiring, from each of the plurality of relay apparatuses, one or more VLANs related to the failed path and one or more priority levels corresponding to the one or more VLANs;
   switch each of one or more paths which is different from the failed path and related to a VLAN of the failed path, to an alternate path, based on the acquired one or more VLANs, the acquired one or more priority levels, and a location at which the communication failure is occurred;

when another route among the one or more paths exists in the alternate path, determine whether to switch the another route based on the acquired one or more priority levels;

switch or maintaining the another route based a result of the determining; and switch the failed path to the alternate path.

9. The management apparatus according to claim 8, wherein the processor is configured to:

when the communication failure is detected by a first relay apparatus of the plurality of relay apparatuses, transmit; by the first relay apparatus; the control frame; and extract the one or more VLANs from among the plurality of VLANs based on information collected by the control frame.

10. The management apparatus according to claim 9, wherein the one or more relay apparatuses includes an access port to access to a computer which is different from the plurality of relay apparatuses.

11. The management apparatus according to claim 9, wherein the processor is configured to:

receive, by a second relay apparatus different from the first relay apparatus, the control frame; and when any priority levels are not set to a related VLAN of the second relay apparatus, store information indicating that any priorities are not set to the related VLAN in the control frame.

12. The management apparatus according to claim 9, wherein the processor is configured to:

generate, by a third relay apparatus which is adjacent to the first relay apparatus; first information in which a VLAN, a priority level, and information of whether the VLAN is affected by the communication failure or not are associated with each other for each of the plurality of VLANs, based on information collected by the control frame, when the control frame is received from the first relay apparatus and when the communication failure between the third relay apparatus and the first relay apparatus is detected; and generate second information in which a VLAN and information of whether switching of a path corresponding to the VLAN is necessary or not are associated with each other for each of the plurality of VLANs, based on the generated first information; and determine whether to disconnect a VLAN for each of the plurality of VLANs by referring to the second information.

13. The management apparatus according to claim 12, further comprising:

transmitting, by the third relay apparatus, an instruction frame for instructing another relay apparatuses in the ring network to disconnect or maintain the plurality of VLANs based on the second information.

14. The management apparatus according to claim 13, wherein a destination of the instruction frame is the first relay apparatus.

\* \* \* \* \*